July 6, 1937.   W. D. FOSTER   2,085,744
PHOTOGRAPHIC APPARATUS
Original Filed Sept. 19, 1925   10 Sheets-Sheet 1

INVENTOR
Warren D. Foster

July 6, 1937.  W. D. FOSTER  2,085,744
PHOTOGRAPHIC APPARATUS
Original Filed Sept. 19, 1925  10 Sheets-Sheet 2

INVENTOR
Warren D. Foster

July 6, 1937. W. D. FOSTER 2,085,744
PHOTOGRAPHIC APPARATUS
Original Filed Sept. 19, 1925 10 Sheets-Sheet 3
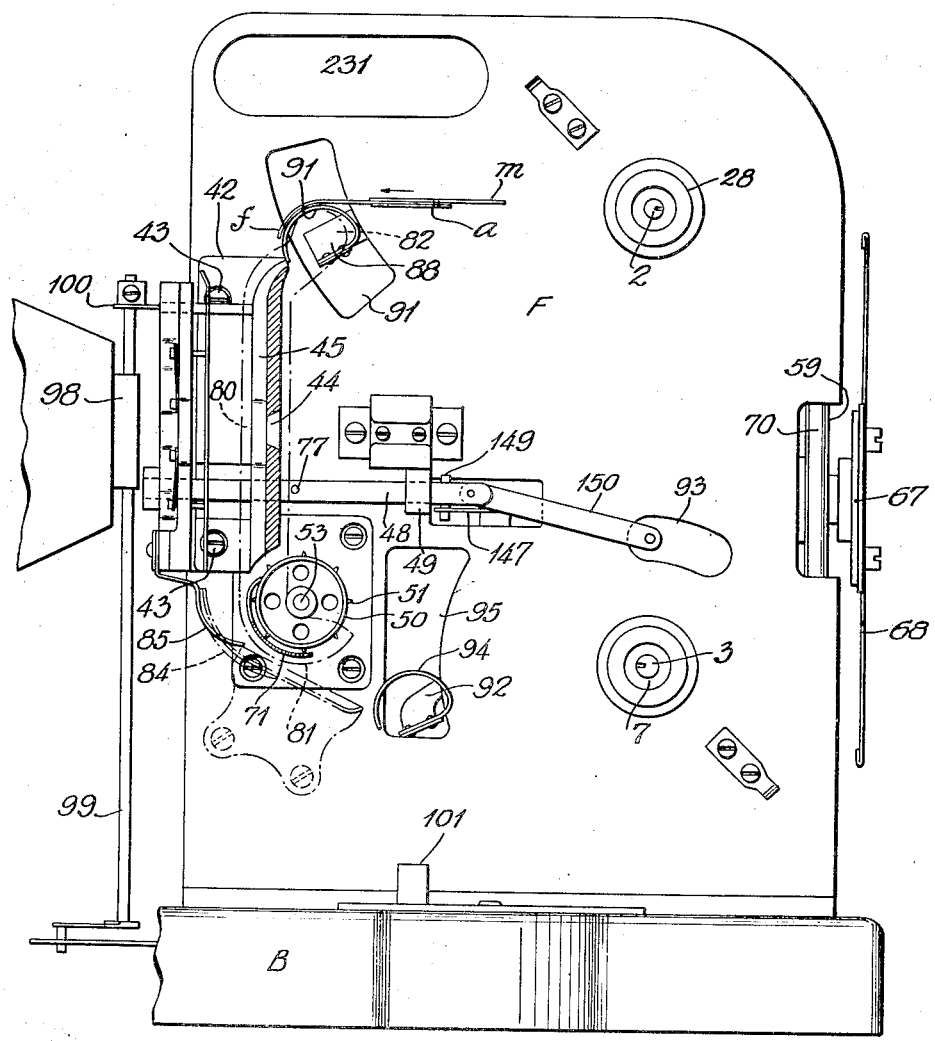
INVENTOR
Warren D. Foster July 6, 1937.  W. D. FOSTER  2,085,744
PHOTOGRAPHIC APPARATUS
Original Filed Sept. 19, 1925   10 Sheets-Sheet 4
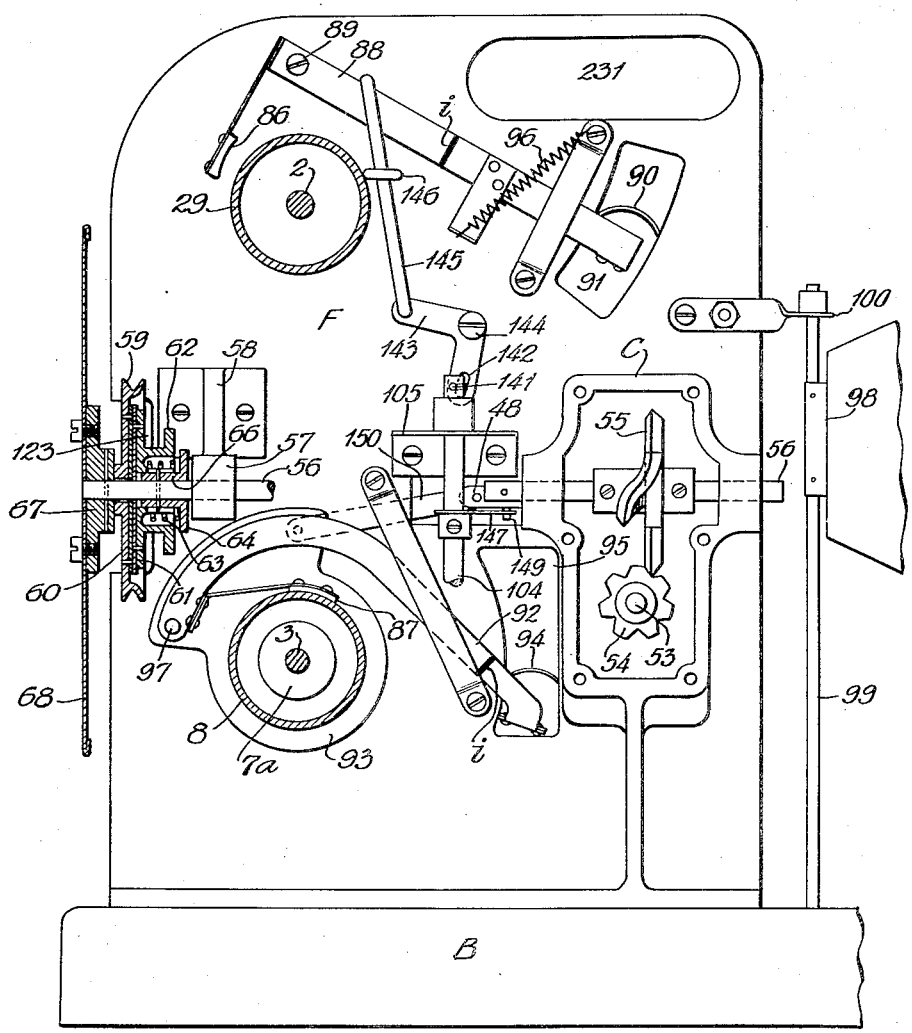

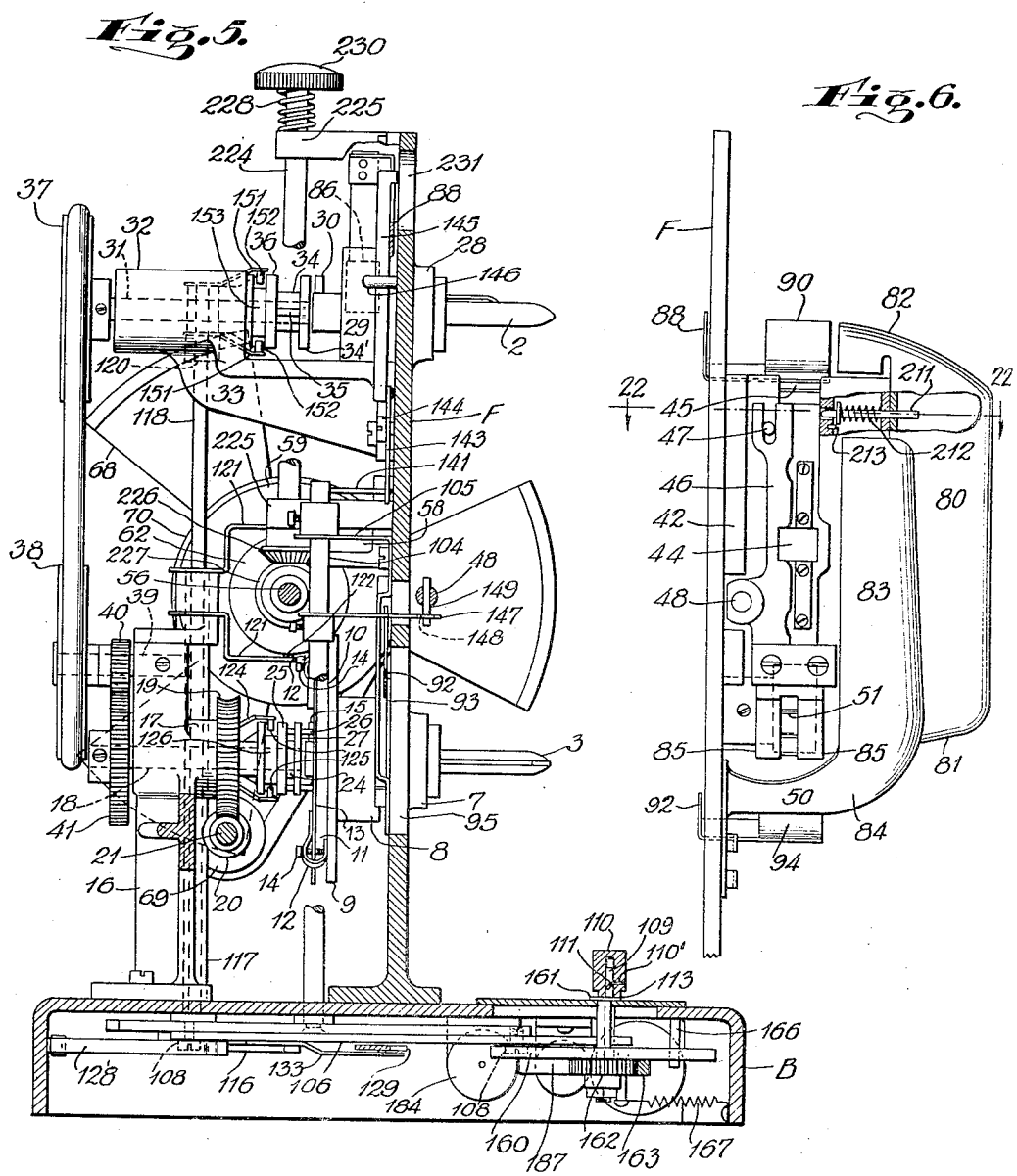

July 6, 1937.  W. D. FOSTER  2,085,744
PHOTOGRAPHIC APPARATUS
Original Filed Sept. 19, 1925    10 Sheets-Sheet 6
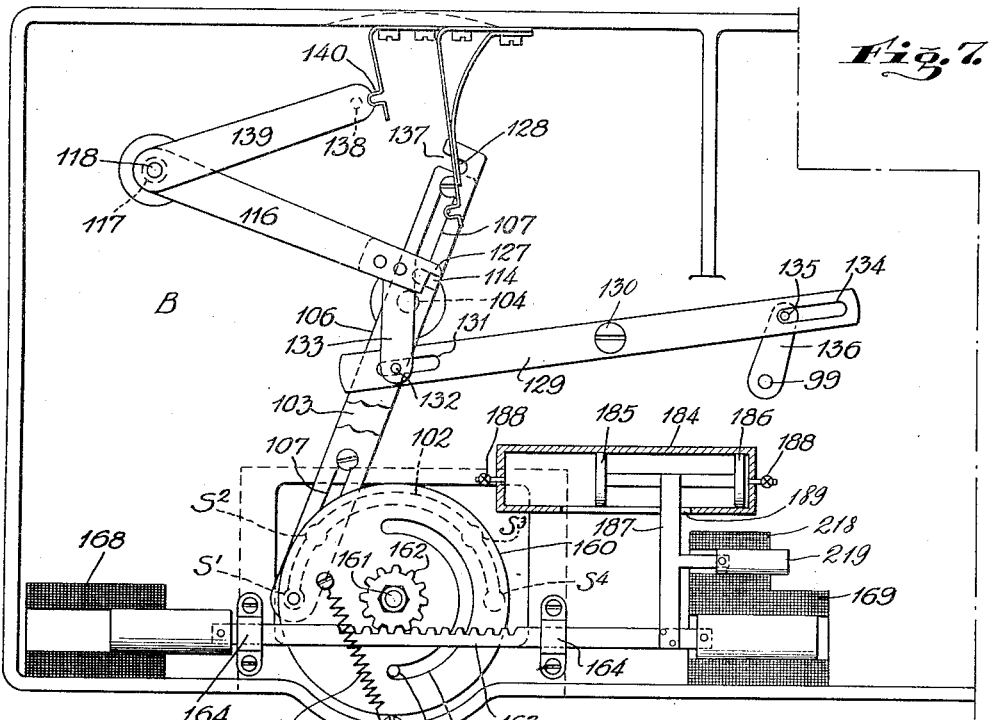
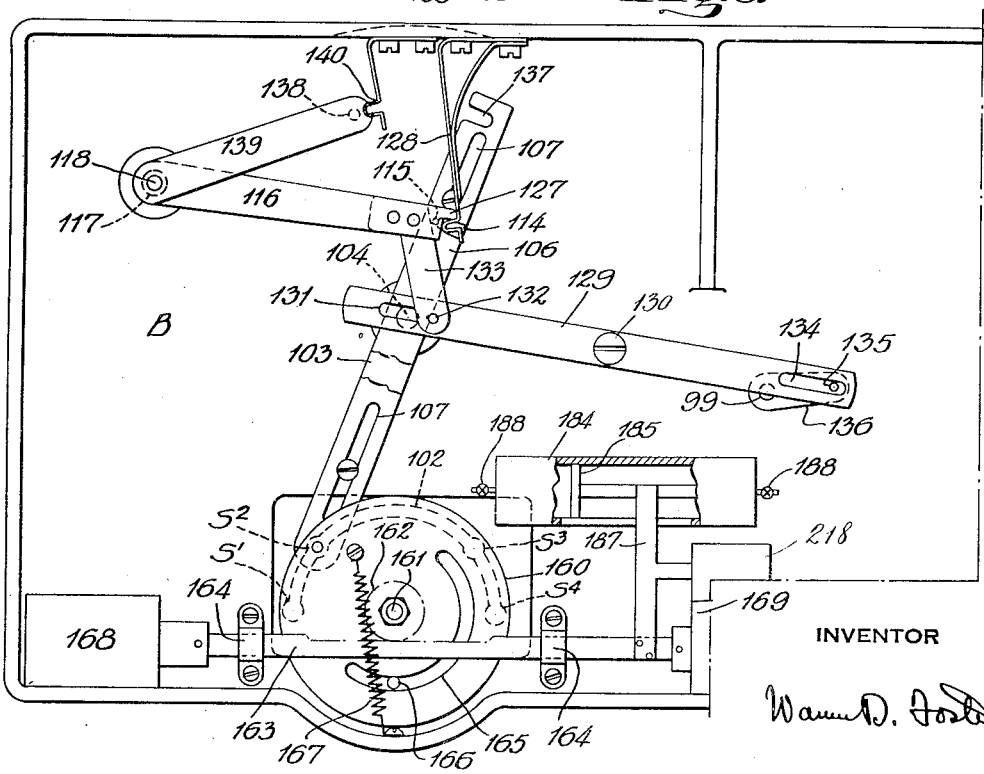
INVENTOR
Warren D. Foster July 6, 1937.  W. D. FOSTER  2,085,744
PHOTOGRAPHIC APPARATUS
Original Filed Sept. 19, 1925   10 Sheets-Sheet 7
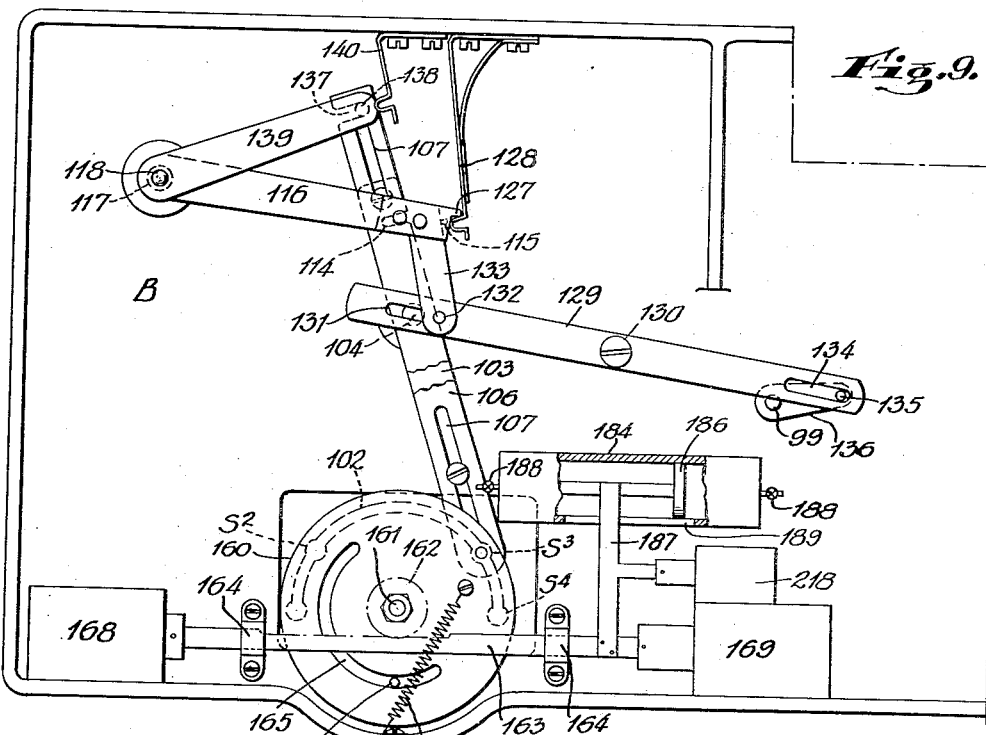
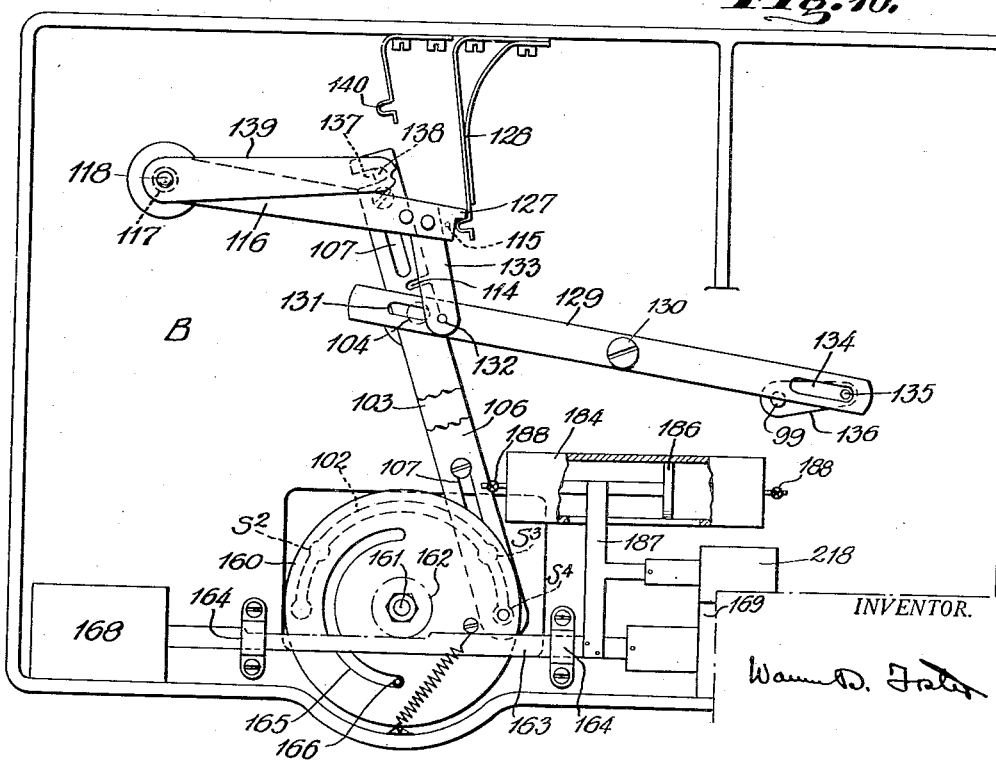
INVENTOR.
Warren D. Foster July 6, 1937.   W. D. FOSTER   2,085,744
PHOTOGRAPHIC APPARATUS
Original Filed Sept. 19, 1925   10 Sheets-Sheet 8
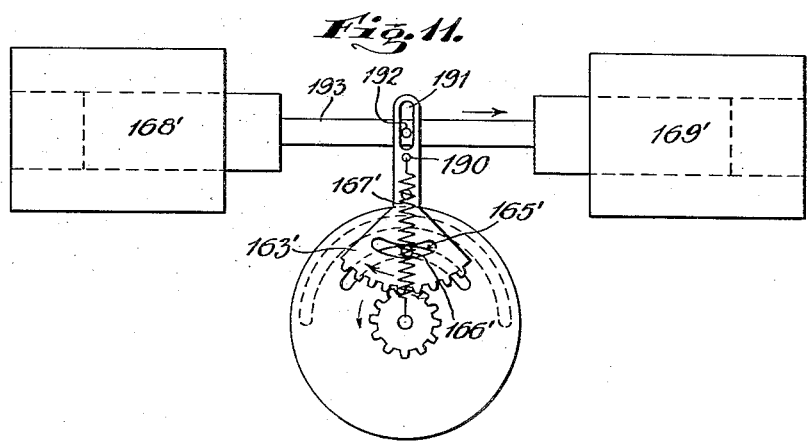
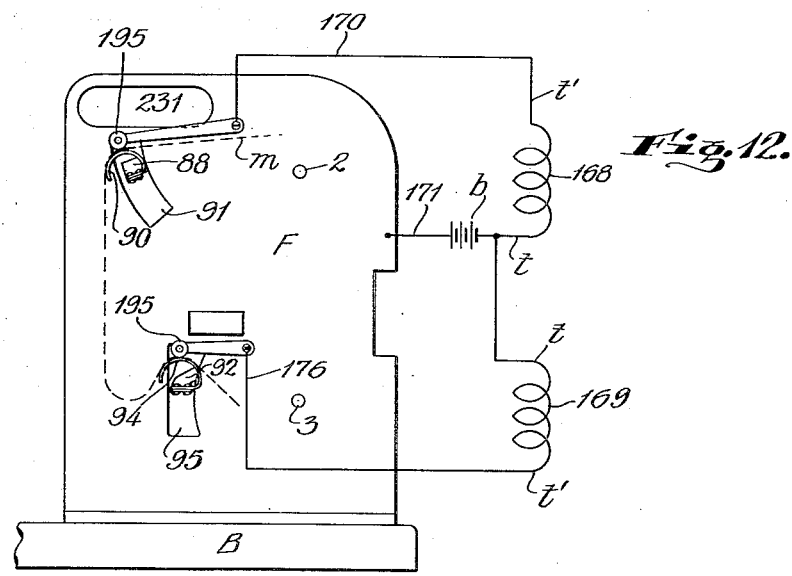
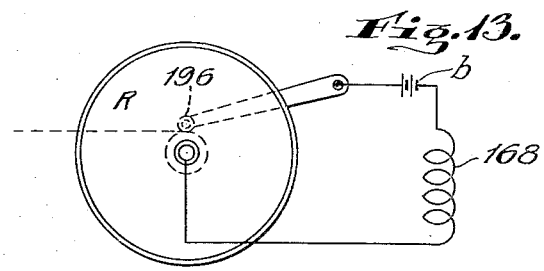
INVENTOR
Warren D. Foster July 6, 1937.　　　W. D. FOSTER　　　2,085,744
PHOTOGRAPHIC APPARATUS
Original Filed Sept. 19, 1925　　10 Sheets-Sheet 9
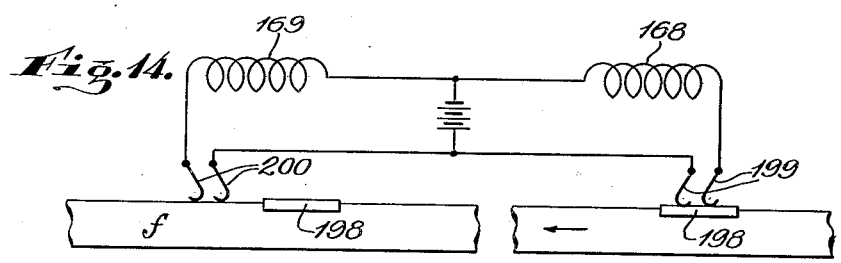
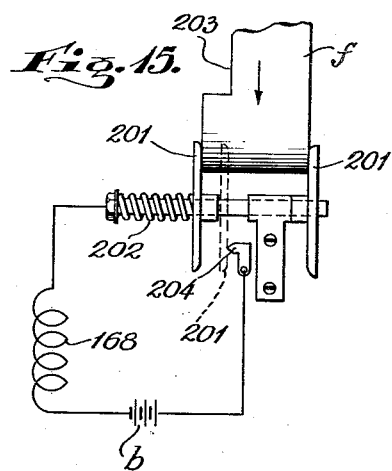
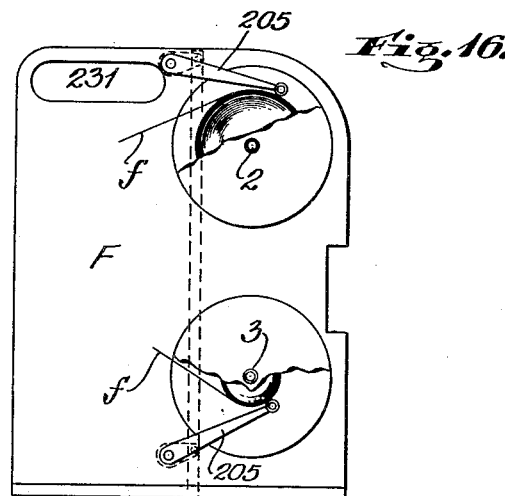
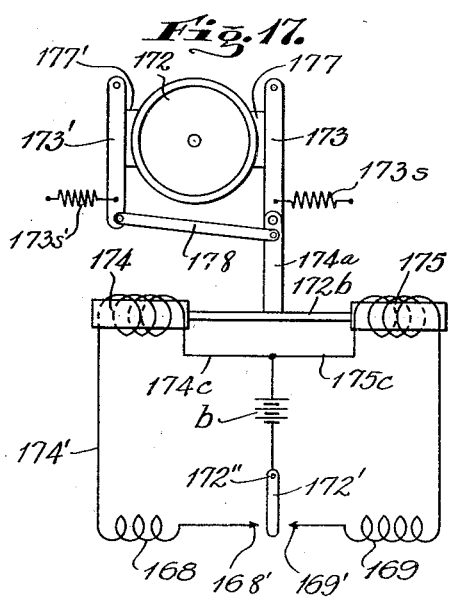
INVENTOR
Warren D. Foster

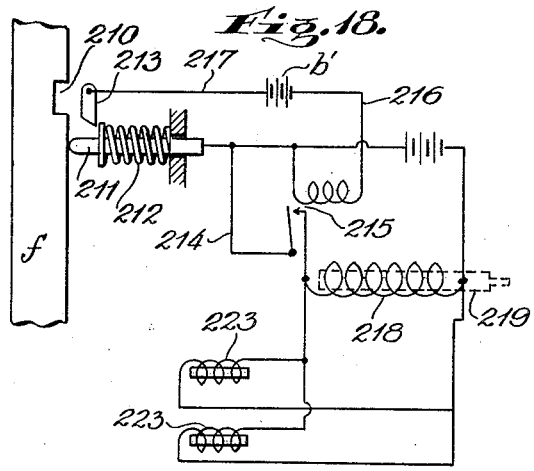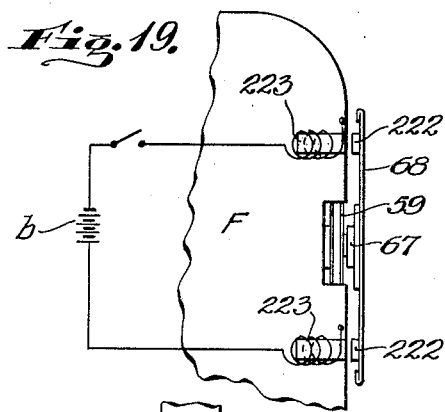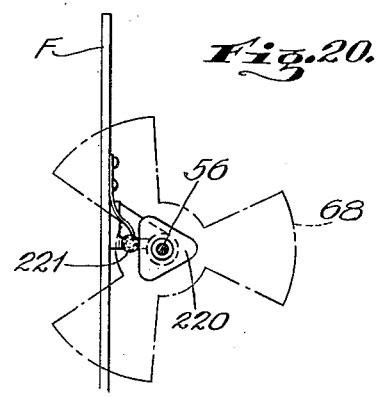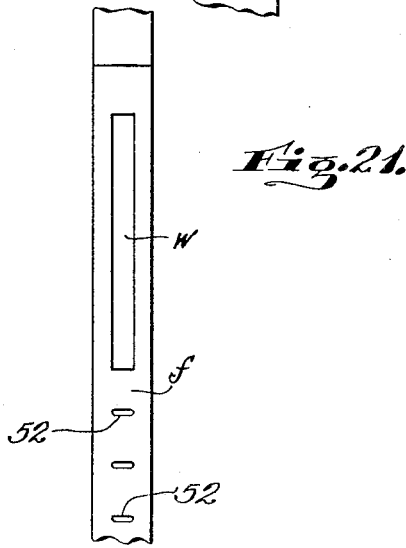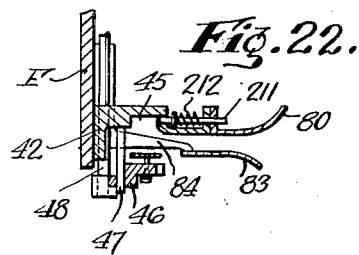

Patented July 6, 1937

2,085,744

UNITED STATES PATENT OFFICE 2,085,744

PHOTOGRAPHIC APPARATUS

Warren Dunham Foster, Washington Township, Bergen County, N. J., assignor to Kinatome Patents Corporation, Ridgewood, N. J., a corporation of New York Original application September 19, 1925, Serial No. 57,392. Divided and this application January 15, 1934, Serial No. 706,766. Renewed August 20, 1934

60 Claims. (Cl. 88—17)

The present invention relates generally to film handling apparatus and more particularly to film handling apparatus used in the motion picture art for the taking and projection of pictures in motion with or without sound or still pictures.

It is common practice to drive motion picture apparatus by spring motors or electric motors. Various operations related to changes of work conditions in such apparatus are preferably performed while the motor is drivingly connected to the apparatus or immediately after its disconnection therefrom. Many of such operations are performed very quickly and heretofore have caused considerable objectionable strain on certain parts of the apparatus, and worse still, have brought strain on the film which, as is well known, is relatively delicate and frangible.

It is an object of the present invention to provide means which can be applied to any kind of power driven film handling apparatus for reducing the strains on the parts and on the film caused by changes in work conditions of the apparatus while it is being driven by a source of power or just prior to the operation of a control mechanism which renders the source of power ineffective upon all or a portion of the operable parts of the apparatus.

Strains caused in a motor driven film handling apparatus by changes in work conditions of the apparatus sometimes may be avoided by stopping the motor and apparatus before or while each change of work condition takes place. Such procedure, in addition to causing a considerable loss of time in the course of a day's operations, ordinarily requires that the motor be started from a dead stop against the full load of the apparatus thus causing objectionable strain. It is another object of the present invention to provide means for use with a motor driven motion picture apparatus which are effective without stopping the motor and apparatus for reducing the strains upon the apparatus caused by sudden changes in work conditions.

In certain kinds of film handling apparatus it is desirable quickly to stop the movement of the film in a predetermined position. It is an object of the present invention to provide improved means for stopping the moving film in a film handling apparatus in predetermined relation to certain parts of the apparatus without causing undue strain on the film or upon the apparatus.

It is desirable in stopping the fast revolving shutter of a motion picture projector for showing still pictures to do so quickly but without causing a severe shock or strain on the moving shutter, and the other parts of the projector connected therewith. To provide means for stopping a shutter in this desirable way is another object of the present invention. Similarly, in a camera it is necessary to stop the shutter in a predetermined relation to the optical axis of the apparatus, and this stopping operation should also take place without jar or strain.

This application is a division from my co-pending application, Serial Number 57,392, filed September 19, 1925, which matured into Patent No. 1,943,303 dated Jan. 16, 1934. In my parent application there are disclosed a plurality of different means for reducing the speed of a motor drivingly connected to a motion picture apparatus for reducing strains on parts of the apparatus and the work piece when changes in the work conditions of the apparatus take place. Combinations of speed-reducing means with a motor and with various operable parts of the apparatus, are broadly claimed in my parent application as is also the introduction of resistance into the motor circuit. Means for applying braking means (but not covering in their scope the introduction of resistance into the motor circuit) to a source of power drivingly connected to film handling apparatus concomitantly with the operation of control mechanism such as is described in my parent application for effecting certain changes in work conditions of the apparatus are described and claimed in the present divisional application.

The present invention is illustrated as applied to the film handling apparatus described in my parent application. It will be understood as the description proceeds that the braking means of the present invention may be applied in a similar manner to other forms of material handling apparatus regardless of whether they are driven by an electric motor or a spring motor or any other source of power.

Another object of my invention is to provide in a power-driven film handling apparatus which has means for rewinding a film means for applying a braking force to the power which drives the apparatus for reducing the momentum of the entire apparatus and the various operable parts thereof preparatory to the change in the direction of movement of the film upon the beginning of the rewinding operation.

Another object of my invention is to provide means for applying a braking force to a power-driven film handling apparatus at predetermined points in the film travel and to maintain the application of said braking force during a predetermined period and then to release said braking force again to permit normal operation of the apparatus.

Control of a film handling apparatus may be advantageously secured by the operative connection of various operable parts of the apparatus with a continuously operating driving means, such as a motor, and their disconnection therefrom. If such operations are carried out without first reducing the speed of the driving means, jar and strain result. An important object of my invention is automatically to apply a braking force to such continuously operating driving means just prior to the operation of such means. Another object of my invention is automatically to release such braking force after the need for it has passed.

In order to provide a disclosure suitable for making clear and definite the numerous and different advantages obtainable by applying a braking means to the source of power of an apparatus concomitantly with the operation of control mechanism for the apparatus, a large portion of the descriptive matter of my parent application appears hereinafter. It can be seen as the description proceeds that my invention may be advantageously embodied in other and more complicated apparatus which is governed by control mechanism. For example, such an apparatus is shown in application Serial Number 352,525, filed April 4, 1929, and owned by the assignees of the present application.

Other objects and advantages of the present invention will be apparent from the following specification and drawings constituting a part thereof, the drawings being for purposes of illustration only of certain preferred embodiments of my invention, in which changes with respect both to operation and construction may be made without departing either from the spirit of my invention or scope of my broader claims.

In the drawings:

Figure 3 is a partial right side elevation broken away to show actuating parts in film threading position;

Figure 4 is a partial left side elevation broken away to show actuating parts in film threading position;

Figure 5 is a cross section on the line V—V of Figure 2 looking in the direction of the arrows;

Figure 6 is a partial view taken on the line VI—VI of Figure 1 showing the right side only to illustrate a portion of the gate;

Figure 7 is a partial bottom plan view showing actuating levers in "normal intermittent projection" position;

Figure 8 is a partial bottom plan view showing actuating levers in "still projection" position;

Figure 9 is a partial bottom plan view showing actuating levers in "film threading or changing" position;

Figure 10 is a partial bottom plan view showing actuating levers in "rewind" position;

Figure 11 is a diagrammatic view illustrating a modified form of actuating mechanism;

Figure 12 is a view largely diagrammatic and illustrating a slightly modified form of circuit for the actuating mechanism;

Figure 13 is a view similar to Figure 12 and showing still another form of circuit control;

Figures 14 and 15 are views similar to Figure 12 and showing constructions in which the edges of the film control the actuating mechanism;

Figure 16 is a view similar to Figure 12 illustrating a control obtained by means of the diameter of the film on its respective carriers;

Figure 17 is a diagrammatic view illustrating one form of control in which the speed of the feeding mechanism is automatically reduced by means of a brake;

Figure 18 is a diagrammatic view illustrating a circuit including a time element adapted for periodically changing the projection from projection in motion to still projection and maintaining such projection for a predetermined time interval or multiple of such intervals;

Figures 19 and 20 are diagrammatic views illustrating different forms of mechanism for insuring the shutter stopping in the desired position for still projection, Figure 19 illustrating a magnetic control, and Figure 20 a mechanical control;

Figure 21 is a detail view of one form of film;

Figure 22 is a cross sectional view taken upon the lines 22—22 of Figure 6.

Figure 1:
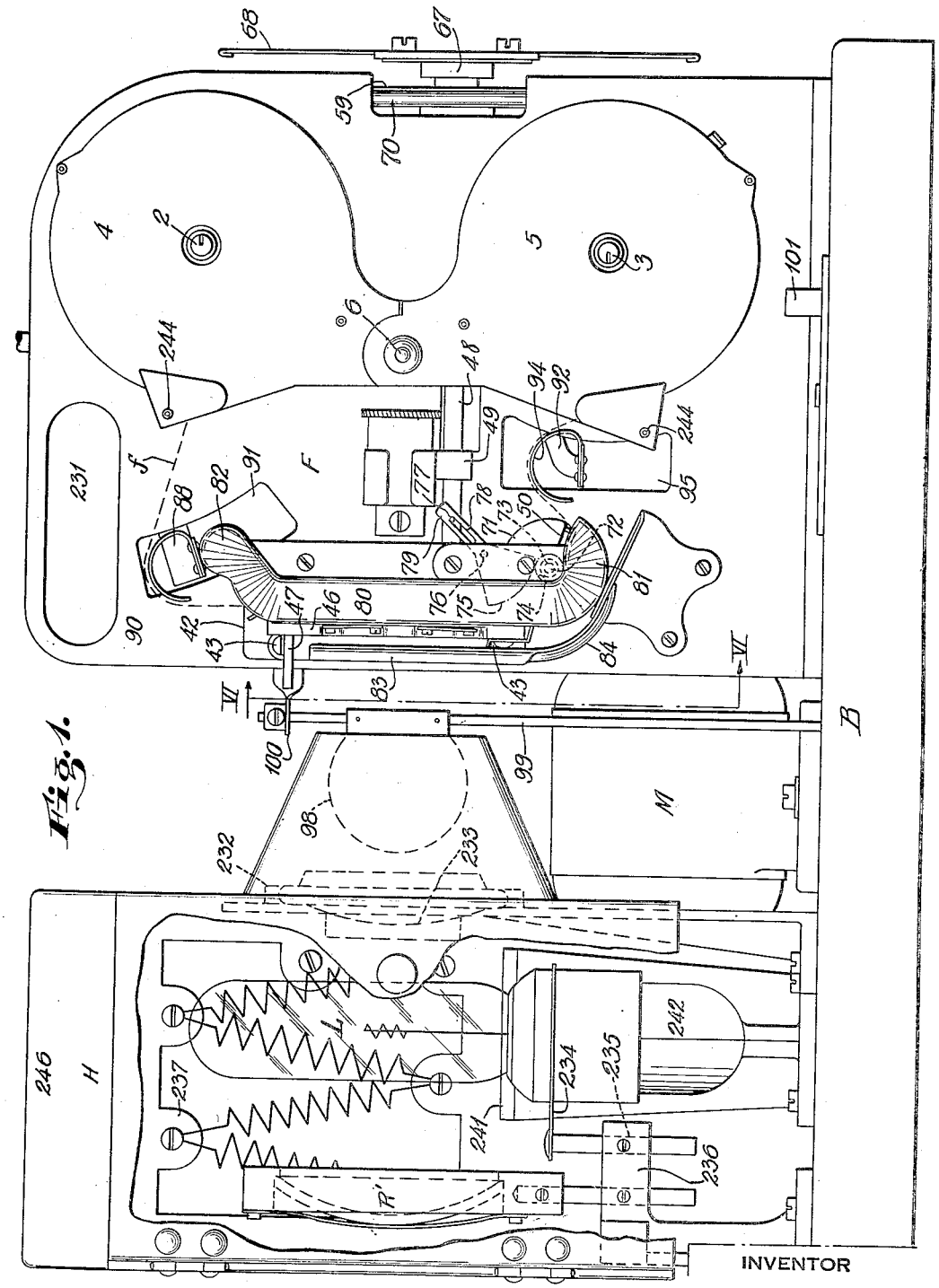
Figure 1 is a right side elevation of the machine, certain parts of the lamp housing being broken away.

Certain of the features of the present invention, and more particularly those with respect to the automatic means for maintaining the desired tension on the film are shown and claimed in the co-pending application of Clarkson U. Bundick and Barton A. Proctor, Serial Number 44,482, filed July 18, 1925 which matured into Patent No. 1,944,022 dated Jan. 16, 1934.

In carrying out the present invention there may be provided an apparatus comprising a supporting base B having mounted thereon a lamp and resistance containing housing H and a supporting frame F upon which are mounted the operating parts of the film feeding and controlling mechanism per se.

Preferably carried by the frame F and projecting laterally from one side thereof in predetermined spaced relationship is a pair of reel receiving spindles 2 and 3, the upper spindle 2 being adapted for the holding of a reel of film during the feeding movement thereof and adapted to effect rewinding of the film at the conclusion of the feeding movement, while the lower spindle 3 is adapted to be positively driven simultaneously with the feeding movement for coiling or taking up the film as required.

The film itself is preferably carried in a combined storage and exhibiting protector comprising a pair of containers 4 and 5 having a pivotal connection 6 whereby the containers may be relatively separated to a predetermined extent to expose the desired length of film therebetween. This construction may be substantially as disclosed and claimed in the United States Patent Number 1,440,173, granted December 26, 1922, to Herbert George Ponting and George William Ford, or may be of any other desired construction.

The lower spindle 3, which will hereafter be referred to as the driving spindle, is journalled for rotation in a suitable bearing 7 in the frame F. The back of the frame is formed with an enlarged boss through which the spindle extends, and beyond the boss there is secured to the spindle a combined brake drum 8 and friction driving member 9. The driving member 9 has a friction surface 10 with which is adapted to cooperate a second friction member 11 in the form of a disc. The disc 11 and the driving member 9 are preferably held in frictional engagement by means of springs 12 carried by the member 9 and bearing against the disc 11 through the medium of an annulus 13, the springs being held under the desired tension and the annulus being maintained in position by adjusting screws 14.

Projecting rearwardly from the disc 11 is a driving lug 15 adapted to be engaged by a clutch hereinafter described in detail by means of which the driving spindle 3 may be frictionally rotated.

Projecting upwardly from the base B in spaced relation to the frame F is a bearing bracket 16 carrying a bearing 17 for a shaft 18 extending in alignment with the driving spindle 3. Secured in any desired manner to the shaft 18 for rotation therewith is a worm wheel 19 adapted to be driven by a worm 20 secured to a horizontally positioned driving shaft 21 located in the rear of the frame F. This shaft at its forward end is mounted in spaced bearings 22 carried by the bracket 16 and is connected to a driving motor M through a flexible coupling 23 of any desired or usual construction. By reason of this mechanism, it will be apparent that when the motor M is operated the shaft 18 will be positively driven through the worm and wheel before referred to. For transmitting this rotational movement from the shaft 18 to the spindle 3 at will there is provided a sleeve 24 secured in any desired manner to the inner end of the shaft 18 and having slidably mounted thereon a collar 25 from which project pins 26 slidable through the enlarged end 27 of the sleeve 24. By moving the collar 25 to the right as viewed in Figure 5, the pins 26 are projected into the path of travel of the driving lug 15 whereby a drive is positively transmitted to the driving spindle. This clutch will hereinafter be referred to as the driving spindle clutch.

The spindle 2, which will hereinafter be designated the rewinding spindle, is mounted similarly to the driving spindle 3 in a bearing 28 carried by the frame F, and has secured to its rear end a brake drum 29 from which projects a pin or lug 30. Extending in alignment with the rewinding spindle 2 is a shaft 31 suitably journalled in a bearing 32 carried by a bracket 33 illustrated as secured to the frame F. Mounted on the inner end of the shaft 31 is a sleeve 34 having an enlarged end 34' through which project pins 35 carried by a collar 36 and constituting a rewinding clutch similar in construction and operation to the construction of the driving spindle clutch. Upon movement of the collar 36 to the right as viewed in Figure 5, the pins 35 will be brought into the path of travel of the pin or lug 30 whereby the rewinding spindle 2 may be operated for effecting a rewinding of a previously displayed length of film.

For driving the shaft 31, it may conveniently have secured thereto a pulley 37 in line with a similar pulley 38 mounted on the outer end of a stub shaft 39 secured in the bracket 16. Also mounted on the shaft 39 is a spur gear 40 adapted to be driven by a similar, but preferably larger gear 41 on the outer end of the shaft 18. By passing a suitable belt around the pulleys 37 and 38 it will be apparent that the shafts 18 and 31 may be simultaneously rotated by the motor M, the shaft 31 preferably rotating at a higher speed than the shaft 18, and that rotative movement in turn may be imparted by either of these shafts to the respective spindles with which they are in alignment by suitable operation of the controlling clutches.

Mounted on the frame F adjacent the motor M and preferably on the front side of the frame is a gate section 42 preferably secured in any desired manner as by screws 43 against movement relatively to the frame. This section is preferably formed with an aperture 44 through which light may be projected as well understood in the art, and with a film guiding depression 45 extending lengthwise of the section, and intersecting the opening 44, for the travel of the film. Cooperating with the section 42 is a relatively movable section 46 preferably guided by a pin 47 projecting outwardly from the section 42, and secured to one end of a gate opening rod 48 slidable through a suitable opening in the gate section 42 and a suitable bearing 49 on the frame F. By reason of this construction, it will be apparent that when the rod 48 is moved to the left as viewed in Figure 1, it will be effective for moving the section 46 away from the section 42 to permit the removal of a film and the insertion of a new film, while movement in the opposite direction will bring the sections into cooperative relationship.

For effecting the desired intermittent feeding motion of a film in position in the gate, there may be provided a feeding sprocket 50 having film engaging teeth 51 adapted to engage apertures 52 substantially centrally positioned in the film $f$, as shown, for example, in Figure 21. This sprocket is mounted on a shaft 53 extending transversely through the frame F and carrying at its opposite end a star wheel 54. This star wheel, which may be of any well known construction, is adapted to be intermittently driven by means of a cam 55 secured adjacent one end of a shutter shaft 56 journalled at one end in a grease casing C within which are mounted the cam 55 and star wheel 54, and at its opposite end journalled in a suitable bearing 57 carried by a bracket 58 projecting rearwardly from the frame F.

Mounted loosely on the shaft 56 adjacent the opposite end thereof is a pulley 59 adapted to be rendered operative at will by a clutch collar 62. The clutch collar is normally urged in such direction as to be in frictional driving engagement with the pulley 59 by means of a spring 63 abutting at one end against the bottom of a spring receiving recess formed in the collar and at the other end against a shoulder 64 on a spring sleeve 66 secured in any desired manner to the shaft 56 for rotation therewith. Secured to the shaft 56 outside of the pulley 59 is a hub 67 carrying a shutter 68 for operation as well understood in the art. The hub 67 and the shoulder 64 take all of the thrust exerted by the spring 63 whereby the shaft 56 as a whole is relieved from any end thrust.

Secured to the end of the driving shaft 21, and preferably substantially in line with the pulley 59 is a pulley 69 around which may pass a belt 70 for driving the pulley 59 from the drive shaft. By reason of this construction, it will be apparent that with the friction surfaces 60 and 61 in engagement rotation will be imparted to the shutter shaft 56 from the driving shaft 21, this rotation being effective not only for operating the shutter but also for obtaining the desired intermittent operation of the film feeding sprocket.

Cooperating with the sprocket 50 and normally occupying the position illustrated in Figure 1 of the drawings, is a stripping shield 71 carried by the inner end of the pin 72 supported in a suitable manner by a bearing 73 constituting part of the fixed gate section 42. Also secured to the shaft 72 is a pinion 74 with which meshes an arcuate rack 75 having a pivotal mounting 76 and operated simultaneously with the operation of the gate rod 48 by means of a pin 77 projecting outwardly from the gate opening rod and engaging a slot 78 in the extension 79 of the arcuate rack. With the construction just described, movement of the gate opening rod to the left as viewed in Figure 1 for the purpose of opening the relatively separable gate sections, will effect rotation of the rack in a counterclockwise direction as viewed in this figure, thereby rotating the shield in a clockwise direction. This rotational movement of the shield will be effective for engaging the film *f* and stripping the same from the sprocket preparatory to the removal of the film from the apparatus. It will remain in this position covering certain of the teeth of the sprocket during the application of a new film or during rewinding, whereby the threading operation of the film is greatly expedited or the film protected during rewinding.

For further assisting the threading movement, the relatively fixed gate section 42 is provided with a projecting guide 80 having a generally curved contour for gradually feeding the film over the fixed gate section, the guide having a downwardly curved and inclined lower end 81 for insuring passage of the film over the sprocket and an upwardly inclined and curved upper end 82 for the purpose hereinafter more fully set forth. The frame F also has secured thereto a secondary guide member 83 positioned in spaced relation to the guiding member 80 and adapted to extend substantially in alignment with the inner face of the movable gate section when it has been moved to open position, whereby the film is effectively guided into position between these gate sections. The member 83 has a curved lower end 84 having a function corresponding to that of the curved end 82 of the guide member 80, and described in detail hereinafter. Projecting downwardly from the lower end of the movable gate section is a pair of spaced guide fingers 85 curved to generally conform to the curvature of the sprocket 50, the space between these fingers being sufficient to accommodate the teeth 51 of the sprocket. These guides cooperate in a manner, as will be readily apparent from the drawings, to permit a film to be positioned between the gate members by merely moving the same laterally relative to its normal direction of travel through the gate. This greatly lessens the time required for threading new film into position, and enables the operation to be performed satisfactorily by an unskilled operator.

In order to entirely obviate the necessity of manually producing slack or loops as heretofore required, there is provided a tension control means of the general character set forth in the application before referred to. This tension control preferably comprises braking means automatically operated by the film, and comprising an upper brake 86 cooperating with the brake drum 29 on the rewinding spindle 2 and a lower brake 87 cooperating with the brake drum 8 on the driving spindle 2. The upper brake 86 is carried by a brake lever 88 having a pivotal mounting 89 on the frame F at the rear thereof and having secured to its opposite end a film guide 90 projecting forwardly through a suitable opening 91 in the frame F. The lower brake 87 is in turn preferably carried by a curved lever 92 secured to a plate 93 loosely surrounding the boss 7ᵃ on the frame F whereby the plate as a unit may be rotated around this boss. At its opposite end the curved lever 92 is provided with a film guide 94 projecting forwardly through a suitable opening 95 in the frame F. During the feeding of a film through the apparatus all of the parts occupy the position illustrated in Figure 1 while during the threading of a film into position or the removal of a film from the apparatus, the parts occupy the position illustrated in Figure 3. In this latter position it will be noted that the guide 94 occupies such a position with respect to the curved lower end 84 of the guide member 83 as to insure the passage of a film upwardly around the guide 94 automatically upon lateral movement of the film, while the guide 90 occupies such a position with respect to the upwardly inclined curved upper end 82 of the guide member 80 as to insure passage of a film over and around the guide 90 by the operation referred to. The lever 88 is normally swung in such direction as to cause the brake 86 to contact with the drum 29 by means of a spring 96. Due to the action of this spring, the brake 86 normally tends to prevent too free rotation of the rewinding shaft and thereby prevents the formation of an undue amount of slack. In the event, however, of not sufficient slack, the tension on the film causes the lever 88 to move in opposition to the action of the spring 96, thereby relieving the braking action of the brake 86 to a corresponding extent and again producing the desired amount of operating slack or loop with a resultant desired tension on the film.

The lower brake 87, on the other hand, is normally so positioned as to exert no appreciable braking action on the drum 8. In the event, however, of undue tension on the film between the feeding sprocket 50 and the reel carried by the driving spindle 3, the film will be effective for swinging the lever 92 in such direction about its pivotal mounting 97 on the plate 93 as to bring the brake 87 into more effective braking engagement with the drum 8. Due to the fact that the spindle 3 is driven from the motor through a friction drive, this braking action will be effective for decreasing the driving force on the spindle 3, and consequently will relieve the tension on the film and produce the desired operating conditions between the sprocket and the lower reel. In this manner the required tension on the film with the requisite amount of slack or loop to insure proper feeding is automatically produced by the mere threading of the film into position and is automatically maintained by the operation of the tension or braking mechanism.

In order to make it unnecessary to utilize any considerable portion of the film for titles or legends, which are obviously adapted for so-called still projection, the apparatus is adapted to periodically occupy a position in which this still projection can be obtained. Preferably, the film will be of such construction, as will hereinafter be described in detail, as to automatically control the change in operating conditions of the apparatus to effect projection in motion, or still projection, the interval of time devoted to the actual still projection being entirely automatically produced, preferably by the film and mechanism controlled thereby.

As will be more particularly described hereinafter, when the changes in operating conditions to effect still projection take place the braking means of my invention may be automatically applied to the motor M. These braking means preferably are initially applied prior to the operative movements of such parts as effect still projection and by means hereinafter disclosed the application of such braking means is maintained until the operative movements of such parts are completed. The braking means are then released. As the description proceeds, the particular strain-reducing advantages resulting from the use of the braking means can be readily seen.

When the apparatus is utilized for this so-called "still" projection of pictures, titles or legends, it is necessary to provide means in the path of travel of the light rays for protecting the film against danger of injury by reason of undue temperature conditions. For effectively shielding the film during such period, there is provided a trap or shield 98 carried by a shaft 99 having its upper end journaled in a bearing 100 projecting from the frame F and having its lower end suitably journaled in the supporting base B. This shaft is adapted to be periodically and intermittently operated in accordance with the character of operation of the machine for bringing the shield positively into position when the apparatus is operating for the still projection of pictures and to throw it out of position for the projection of pictures in motion.

While the present apparatus is not necessarily limited to any particular field of use, it is primarily intended either for use in advertising for the successive showing of a length of film or for use by persons who may be unskilled in the art. With this dual purpose in view, it is desirable not only to provide for automatic control, but also to simplify the control to as great an extent as possible not only for the purpose of rendering the operation easier, but for the purpose of making such operation foolproof. For this purpose there is preferably provided a single control member in the form of a knob or button 101 projecting upwardly through an arcuate slot 102 in the supporting base B. This slot may be so shaped as to provide four operating stations designated, respectively, S1, S2, S3 and S4. The button 101 is adapted to be moved at will either manually so as to occupy any one of these stations, or automatically so as to occupy any of stations S1, S2 or S4. With this button at the station S1, the respective parts of the apparatus are in such position as to insure the normal projection of pictures as usual motion pictures. With the control button at station S2, there is obtained a so-called still or stereopticon projection, the movement of the button from the station S1 to the station S2 being effective for disengaging the respective driving mechanisms which are in operation during the projection of pictures in motion. With the button in position at station S3, the respective parts of the apparatus are in such position as to permit the positioning of a film therein or the removal of a film which has just been fed therethrough. It will be understood that the movement of the button from station S2 to station S3 automatically produces the required change in the operating position of the parts. With the button in position at station S4, the respective parts of the apparatus are in such position as to permit rewinding of the film by means of the motor M. The movement of the button from station S3 to station S4 automatically produces the required change in operating conditions necessary for such rewinding. This provision of a single control member movable only in a predetermined manner and automatically effective upon movement for producing all of the necessary changes in operating conditions constitutes an important feature of the present invention, as it renders the control and operation of the apparatus extremely simple and substantially foolproof.

The control mechanism actuated either manually by the control knob or automatically as hereinafter set forth in detail, is to a large extent shown in Figures 7, 8, 9 and 10, inclusive, which illustrate in succession the change in the position of the parts of the control mechanism by movement of the control button successively to the respective stations. This mechanism may comprise a lever 103 keyed or otherwise secured to the lower end of a brake release rod 104 having its lower end journaled in any desired manner in the base B and its upper end journaled in a bearing bracket 105. Being secured to the brake release rod 104 which is capable only of a turning movement about its longitudinal axis, the lever 103 is restricted in its movements to rotation only. Carried by the rotating lever 103 is a combined sliding and rotating lever 106 having adjacent each end a slot 107 through each of which projects a headed pin 108 by means of which the combined sliding and rotating lever is effectively mounted on the rotating lever for rotational movement simultaneously therewith and sliding movement independently thereof. At its front end the lever 106 carries an upstanding pin 109 having a head 110 provided with an inwardly projecting pin 110' adapted to engage a bayonet shaped slot 111 in the pin 109. By reason of this construction it will be apparent that the button may be moved vertically on the pin 109 by a rotative movement thereof so that it may either occupy an upper or a lower position on the pin. At its lower end the button has a collar 113 of a diameter to substantially conform to the contour of the slot 102 at the respective operating stations, whereby with the button in its lower position accidental movement from one of these stations is prevented, while with the button in its upper position the parts are free for automatic operation independently of any operator.

At a point intermediate its length the combined rotating and sliding lever 106 is provided with a transversely extending recess 114 adapted to cooperate with a pin 115 projecting upwardly from a lever 116 which is secured adjacent one end on a control sleeve 117 surrounding a control rod 118, the sleeve and rod extending upwardly through the base B and journaled for rotational movement in bearings 119 carried by the bracket 16 and by an upper bearing 120 carried by the bracket 33. Adjacent its upper end the control sleeve 117 has projecting therefrom forked operating arms 121 carrying projecting pins 122 adapted to normally lie in the groove 123 of the clutch member 62 on the shutter shaft 56. By reason of this construction it will be apparent that upon rotation of the sleeve 117 in a counter-clockwise direction, as viewed in Figure 7, the clutch members 60 and 61 will be disengaged, thereby destroying the driving relationship between the main drive shaft 21 and the shutter shaft 56.

At an intermediate point the control sleeve is also provided with a similar pair of arms 124 having pins 125 normally projecting into the groove 126 of the clutch collar 25. Rotation of the sleeve in a counter-clockwise direction as just described will be effective through the arms 124 for disengaging the driving spindle clutch to thereby permit the driving spindle to move freely in either direction. Engagement of the driving spindle clutch and the shutter shaft clutch will be effective for the so-called projection of pictures in motion but this engagement is not required for still or stereopticon results. This operation of the sleeve 117 is obtained by moving the control button from station S1 to station S2, or from the position shown in Figure 7 to the position shown in Figure 8, by reason of the relative movement imparted to the sleeve due to the sliding action of the lever 106. This movement will also be effective for bringing the projection 127 on the lever 116 into holding engagement with the detent spring 128 whereby the sleeve will be held in the position to which it has just been moved until such time as the control button is manually moved from station S2 to station S1.

In changing from the normal projection to the projection of still pictures, it is also necessary to move the shield or screen 98 into position. This is positively accomplished simultaneously or in timed relation with the rotation of the sleeve 117, through the medium of a lever 129 pivoted at its intermediate portion on a stud pivot 130 secured in the base B. At one end the lever 129 has a slot 131 within which projects a pin 132 on an extension 133 projecting from the lever 116. At its opposite end the lever 129 has a slot 134 in which projects a pin 135 extending downwardly from a crank arm 136 on the lower end of the shaft 99. Through the medium of the mechanism just described the movement of the lever 106 will rotate the lever 129 in such direction as to swing the light shield into light intercepting position. It will be noted that this movement of the light shield takes place positively in timed relation to the movement of the operating parts necessary in obtaining still projection, and thereby eliminates any possibility of injury to a film while stationary.

It may be assumed that after the single projection of a film, or the repeated projection thereof, it is desired to change the same, or that in starting it may be necessary to move the parts of the apparatus into such position that a film may be threaded into position therein. Under such circumstances the control button will be moved from station S2 to station S3. This movement will be effective only for rotating the brake release rod 104 and for bringing a recess 137 in the lever 106 into cooperative engagement with a pin 138 projecting upwardly from a lever 139 secured to the lower end of the control rod 118. The lever 139 is normally held in the position illustrated in Figures 7, 8 and 9 by means of a detent spring 140 cooperating therewith, as clearly illustrated in the drawings. The rotation of the brake release rod is effective for opening the gate sections of the gate, for moving the brakes 86 and 87 and their associated parts to inoperative position and for so actuating the stripper shield 71 as to effect the desired stripping movement of a film from the sprocket 50 or the shielding of the sprocket to permit the threading of a new film into position. These operations are obtained by securing to the upper end of the brake release rod a pin 141 extending into a slot 142 in one arm of a bell crank lever 143 having a pivotal mounting 144 on the back of the frame F. The opposite arm of the bell crank lever is in cooperative engagement with one end of a link 145 movable through a slide or guide 146 and having its upper end bent inwardly to extend over the brake lever 68. Movement of the control button from the station S2 to the station S3 will be effective for rotating the brake release rod 104 in a clockwise direction, as viewed in Figure 9, thereby rotating the bell crank lever 143 in a counter-clockwise direction, as viewed in Figure 4, and consequently rotating the brake lever 88 about its pivotal mounting 89 in opposition to the spring 96 for moving the brake 86 to inoperative position.

Movement of the lower brake is obtained simultaneously with actuation of the upper brake through the medium of a crank lever 147 secured at an intermediate point to the brake release rod. This crank lever has a slot 148 in its free end into which projects a downwardly extending pin 149 carried by the gate control rod 48. The right hand end of the gate control rod as viewed in Figure 3 is connected by a link 150 with the brake lever 92, whereby said brake lever and the gate control rod operate in unison. Movement of the brake release rod occasioned by operation of the control button from station S2 to station S3 is effective for rotating the plate 93 and all parts carried thereby in such direction as to lower the film guide 94 in the slot 95 and bring it into such cooperative relation to the guides 80 and 83 as shown in Figure 3 as to facilitate the removal of a film or the positioning of another film. This movement of the gate control rod will also tend to separate the gate sections and will move the shield 71 into stripping and shielding position, as will be obvious.

If it is not desired to change a film, as would be the case in advertising for example, the control button may be moved from station S3 to station S4, or may be moved from station S2 to station S4 without stopping at station S3. This movement will be effective by reason of the engagement between the recess 137 and the pin 138 for rotating the control rod 118. At its upper end this control rod carries spaced arms 151 similar to the arms 117 and 124 previously described and provided with pins 152 normally lying in the groove 153 in the rewinding clutch collar 36. The rotation of the control rod 118 as occasioned by the movement of the control button from station S3 to station S4 will be such as to move the rewinding clutch into operative position, whereby the spindle 2 is connected in driving engagement with the shaft 31, this engagement being such that the film may be rewound by the continued operation of the motor M.

From the foregoing it will be apparent that the operation of a single control button performs in succession the necessary changes in the operating positions of the various parts for permitting any desired condition of operation of the apparatus. Upon movement of the control button from station S4 to station S3 the rewinding clutch will be disengaged and the lever 139 moved into cooperative engagement with the detent 140. Upon movement from the station S3 to the station S2, the recess 137 will leave the pin 138 and the brake release rod 104 will be rotated in the opposite direction to that heretofore described. Upon movement of the button from station S2 to station S1, the lever 116 will be disengaged from the detent 128 and its movement will effect reengagement of the shutter clutch and of the driving spindle clutch. At the same time, lever 129 will be restored to its original position, thereby effecting movement of the light shield to inoperative position.

Reference has heretofore been made to the adaptability of the apparatus to advertising or other purposes wherein repetitive showing of the film is desirable, and wherein for practical reasons it is not feasible to have an operator in constant attendance. In such cases the movement of the control parts may be automatically obtained merely by moving the control button 101 to its upper position on the pin 109 as before described. When in this position there will be no holding or locking effected by the button, so that all of the parts are free for automatic operation. Mechanism for this purpose is shown in Figures 7, 8, 9, 10 and 11, while modified forms of control for this purpose are illustrated in Figures 12, 13, 14, 15, 16 and 18.

As shown in Figures 7 to 10, both inclusive, one form of mechanism may comprise a disc 160 having a pivotal or rotative support 161 on the base B. This disc has secured thereto the pin 109 whereby rotation of the disc will accomplish the same movement of the control mechanism as is effected by movement of the button 101. Such rotation may be obtained by providing a pinion 162 concentric with the support 161. Cooperating with this pinion is a rack 163 preferably of rectangular or angular cross-section whereby it may be effectively held in a desired operating position by means of guides 164 on the base B. Formed in the disc 160 is an arcuate slot 165 into which extends a stop pin 166 projecting downwardly from the base of the apparatus. The length of the slot is such that it will just permit enough rotation of the disc to move the pin 109 from station S1 to station S4 or vice versa, the stop pin positively stopping the disc in desired position at these stations. Accidental movement away from these stations may be prevented by the provision of a comparatively strong tension spring 167 having one end secured to the disc and the opposite end attached to the base B, the point of attachment to the disc being such that after the disc passes a midpoint in moving between stations S1 and S4 the spring will be effective for assisting in completing such movement, the spring being placed under gradually increasing tension until such midpoint is reached.

For producing movement of the rack bar 163 it may be constructed either throughout, or may have end portions, of magnetic material adapted to act as cores for the solenoids 168 and 169. As viewed in Figures 7 to 10, it will be obvious that energization of the solenoid 168 will be effective for rotating the disc 160 in a clockwise direction, while energization of the solenoid 169 will effect rotation of the disc in the opposite direction. Thus, the solenoid 168 will be effective for moving the control mechanism from station S1 to station S4 to establish rewinding conditions, while the solenoid 169 will be operative at the conclusion of rewinding to reestablish projecting conditions.

The energizing of the respective solenoids at predetermined time intervals may obviously be accomplished automatically in a number of different ways. As illustrated in Figures 7 to 10, both inclusive, this may be effected by the film $f$ by securing to each end thereof a length of fire resisting or fireproof material $m$ such as copper or the like, there being preferably a length of non-conducting material, such as asbestos $a$ on at least one side of the film and either connecting the strip $m$ thereto or serving to cover the strip $m$ throughout a portion of its length. It may be assumed that the film is traveling in the direction indicated by the arrow in Figure 3 for projection purposes, such travel having effected display of the film and brought the strip $m$ into contact with the upper guide 90 which is of conducting material and secured to the brake lever 88 by insulation $i$.

At this time current will flow from a suitable source $b$ to one terminal $t$ of the solenoid 168, thence through the solenoid to the terminal $t'$ having a connection 170 with the guide 90. From the guide the circuit will be completed through the strip $m$ to the container 4, spindle 2 and frame F connected by wire 171 to the opposite side of current source $b$. The solenoid thus energized will move rack bar 163 to the right and rotate disc 160 in a clockwise direction initially against the action of spring 167, and thereafter with the assistance of this spring to the limit allowed by the stop pin 166. During the first part of this movement the driving spindle clutch and the shutter clutch will be disengaged, while during the concluding part of the movement the rewinding spindle clutch will be thrown into engagement. This will start the rewinding of the film, and consequently break the circuit of solenoid 168.

It will be apparent that the foregoing operation is obtained without throwing any extra load onto the motor M. Its maximum duty, and consequently its size, may thus be determined entirely by the projecting and rewinding operations, together with cooling as hereinafter described. This enables the use of a motor of minimum size and current consumption, which may be continuously operated in the same direction during the use of the apparatus.

It will be understood by those skilled in the art that if the film is stripped from the toothed sprocket 50 during such time as the sprocket may be rotating at a relatively high speed, such operation is likely to cause the film to be injured by the sprocket teeth. Such injury may be prevented by employment of braking means, such as are illustrated in Figure 17. These braking means may be applied to a brake drum 172 fastened on the shaft of the motor M or any other source of power which may be used to replace the motor M for driving the apparatus and the parts thereof such as the sprocket 50. This braking means may include two brake operating solenoids 174 and 175, which have their cores connected by a bar member 172b. Strongly and rigidly mounted on the bar 172b is an upwardly extending arm member 174a which has its upper end pivotally connected to the lower end of the pivoted member 173 which carries a brake shoe 177 disposed in close proximity to the drum D at the right thereof as viewed in Figure 17. A pivoted member 173' similar to the member 173 carries a brake shoe 177' disposed on the opposite side of the drum D from the brake shoe 176. The lower end of the brake shoe carrying member 173' is connected by a link member 178 to the upper end of the member 174a. Springs 173s and 173s' are fastened to the members 173 and 173' respectively normally to urge them away from the brake shoe D.

For operating the solenoid 174 there is provided a circuit which includes a conductor 174' connecting the coils of the solenoid 174 with the coil of the solenoid 168. The coil of the solenoid 168 is connected with a contact terminal 168' disposed at the right of the solenoid 168 as viewed in Figure 17. The circuit of the solenoid 174 further includes a conductor 174c leading to one side of a source of electricity $b$. From the other side of the electric source $b$ a conductor extends to a connection with an armature piece 172' which may be pivotally mounted at 172''.

The solenoid 175 has a circuit similar to the circuit described for the solenoid 174 which includes a conductor 175' connecting the solenoid 175 with the solenoid 169. The coil of the solenoid 169 is connected to a contact terminal 169' disposed on the opposite side of the armature 169' from the terminal 168'. The solenoid 175 also has a connection with the source of electricity b extending through a conductor 175c.

The armature piece 172' is disposed in normal position between the contacts 168' and 169' out of engagement with each contact, and may be arranged in a well known way to be attracted against the contact terminal 168' when the solenoid 168 is energized. This operation will close the circuit of the solenoid 174 which upon being energized moves the connecting member 172b to the left as viewed in Figure 17 and brings the brake shoe 177 against the drum 172 and thereby slows down the source of power to which the drum is connected. When the solenoid 168 is de-energized the armature piece may be swung away from the contact 168' by gravity or by a well known arrangement of opposed springs to its Figure 17 or open position.

The solenoid 169 when energized will attract the armature piece 172" against the contact terminal 169' and close the circuit to the solenoid 175. This will cause the connecting bar 172b to be moved to the right as viewed in Figure 17 and thereby pull the brake shoe 177' against the drum 172 and slow down the source of power. After the film has been moved a predetermined distance in a rewinding direction, for example, the circuit to solenoids 168 and 174 will be broken, thereby permitting the motor to operate at full speed for rewinding purposes.

It can be readily seen by those skilled in electro-magnetic devices from the disclosure hereinbefore regarding the application of a braking force to the drum 172 that the same means which effect the energization of the solenoid 175 concomitantly with the operation of the solenoid 169 will also be effective to energize the solenoid 175 upon the operation of the solenoid 218, the inner end of which is coextensive with the inner end of the solenoid 169.

At the conclusion of the rewinding, the strip m on the opposite end of the film will contact with the lower guide 94, also connected through insulation i with the brake lever 92. At this time current will flow from the source b to terminal t of the solenoid 169 and thence through the solenoid to terminal t' having connection 176 with the guide 94. From this guide current will pass through strip m to container 5, spindle 3 and frame F to connection 171 and source b. This will produce a reverse operation of disc 160, and consequently restore the parts to normal projecting position.

Since it is also desirable to slow down the rotation of the sprocket 50 during its re-engagement with the film, there is provided the magnetic means 175 which is operable for applying the brake so long as solenoid 169 is energized. As this solenoid remains energized until after normal projection again commences, but is de-energized by the film movement thus produced, it will be apparent that the desired speed conditions are obtained at the exact time required.

In addition to effecting a slowing down of the sprocket speed, it may also be desired to produce an actual dwell between the actual disengagement of the driving spindle clutch and the shutter clutch, and the engagement of the rewinding spindle clutch, or vice versa. This may be accomplished by the provision of a timing device in the form of a dash pot 184 with which cooperate pistons 185 and 186 carried by a projection 187 on the rack 163. The dash pot, which may be of double construction, has a controllable release 188 for each end thereof whereby the speed of travel of the piston in either direction may be controlled, the length of slot 189 through which the projection 187 extends determining the time at which the dash bar first becomes effective in either direction. This is desirable, as initially the rack bar should move at high speed to effect disengagement either of the driving spindle clutch and shutter clutch, or disengagement of the rewinding spindle clutch, depending on the direction of travel of the rack bar. Thereafter, the dash pot becomes effective, and by the setting of the release valves 186 variably times the period of dwell before the concluding movement of the rack bar is accomplished. This variable timing is of importance, as it provides flexibility for different operating conditions or films of different characteristics.

In Figure 11 there is illustrated a modified form of actuating mechanism in which the rack 163 is replaced by a segmental rack 163' having an extension 190 formed with a slot 191 into which projects a pin 192 on the solenoid core 193 separated by solenoids 168' and 169' as before described. The segmental rack may be formed with a slot 165' into which extends a stop pin 166'. A spring 167' similar in construction and operation to spring 167 may also be provided.

In Figure 12 there is illustrated a slightly modified form of circuit control in which the circuit is completed between a roller contact 195 with either guide 90 or 94 when a metallic portion m of the film f comes into position between the same.

Figure 13 illustrates still another embodiment, in which each reel or carrier R may have cooperating therewith a gravity operated contact finger 196 adapted when the film is completely unwound from either of the reels or carriers to come into contact with the metallic strip on the end of the film and complete the desired circuit.

Figure 14 is illustrative of still another form of circuit control in which the film f is illustrated as having secured adjacent each end thereof a metal contact clip 198 adapted to engage brushes 199 at one end or brushes 200 at the other end constituting part, respectively, of the circuits for solenoids 168 and 169, and thereby completing the circuit when the clip at either end engages the corresponding brushes.

In Figure 15 the control for each end of the film is shown as comprising discs 201 engaging opposite sides of the film, and normally urged one toward the other by a spring 202. Adjacent each end this film has a portion 203 of reduced width, thereby permitting discs 201 to move together and engage contact 204 and thus complete the desired circuit.

The form of control shown in Figure 16 is desirable for some, but not all purposes, as it is not definitely operable in successive cycles at exactly the same points in the film travel, due to variations in the looseness of the film on the reels. It comprises, however, arms 205 pivotally mounted and secured to a link 206 cooperating at its lower end with a switch arm 207 adapted to engage either contact 208 or contact 209. One of the arms 205 cooperates with the film on the upper reel, while the other arm cooperates with the film on the lower reel. By reason of this construction, when the film on the lower reel builds up to a predetermined diameter the link 206 will be moved downwardly, bringing the switch arm 207 into engagement with contact 208 in the circuit of solenoid 168, and thereby effect rewinding.

When rewinding has continued to such an extent as to provide a predetermined diameter of film on the upper reel, the link 206 will move upwardly and cause switch arm 207 to engage contact 209 in the circuit of solenoid 169. This will be effective for returning the parts to normal projecting position.

As before pointed out, titles, legends and the like are of such nature that still projection thereof accomplishes all of the results desired. Where such still projection can be obtained, it is possible to effect a saving of a very substantial portion of each length of film, as the desired matter need only appear in a comparatively few frames, the film remaining stationary while one of these frames is in projecting position. In order, however, to make it possible to obtain the full advantages of such a condition, it must be possible to change automatically from normal projection of pictures in motion to so-called still projection.

The present invention embodies means by which this change in operating conditions may be automatically produced, and the film held stationary for a predetermined unit time interval, or for a time interval representing any desired multiple of the unit interval. In Figure 19 there is illustrated in detail one form of mechanism by means of which such an operation is possible. In accordance with this embodiment, the film f may be provided at desired intervals, determined entirely by the character of the indicia appearing on the film at such intervals and the consequent desired type of projection of such indicia, with notches 210. Normally, the edge of the film cooperates with a finger 211 urged toward the film by a spring 212. When the film occupies such a position that a notch 210 comes opposite the finger, the finger moves inwardly and engages a contact 213. The finger has a connection 214 with one terminal of a time relay 215, the opposite terminal of which is connected by wire 216 with the source of current b. The contact 213 is in turn connected by wire 217 with the opposite side of the source of current.

Thus, the movement of the finger 211 inwardly automatically energizes the time relay. This relay in turn controls the energization of solenoid 218 into which extends the core 219 constituting part either of rack 163 as shown in Figures 7 to 10, or part of the core 193 of the form illustrated in Figure 11. In either case, the solenoid 218 when energized will be effective for moving the disc 160 in a clockwise direction. The dimensioning of the core 219 with respect to the center of the magnetic field of the solenoid 218 is such that the solenoid 218 will only be effective for moving the disc 160 a distance sufficient to bring the pin 109 to station S2, which is the station for still projection. The parts will remain in this position until the time relay, operating as well understood in the electrical art, breaks the circuit of solenoid 218. At such time the spring 167 or 167' will be effective for automatically restoring the parts to normal projecting position at station S1. The time relay may obviously be actuated by other means as shown, for example, for the solenoids 168 and 169.

If it is desired to have a still projection condition longer than that represented by one unit time interval of the time relay 215, the film may have a second notch 210 in the next picture frame, so that the foregoing cycle will be immediately repeated. This repetition may occur as often as desired.

It will be understood that with the parts in position at station S2, the heat shield is in position and the shutter is out of operation. Both of these features are extremely desirable. The heat shield enables the use of a light source such as to give the desired results for normal projection which is usually considered as requiring approximately 40 per cent more light than that necessary for still projection. The heat shield may then be designed to filter out or obstruct approximately 40 per cent of the light rays, thereby preventing the film from becoming injured by the heat of the light rays focused thereon. In other forms of apparatus in which a heat shield has not been provided, it has been necessary in order not to injure the film during periods of still projection, to use a light source insufficient for normal projection in motion. The stopping of the shutter during still projection is also desirable, as it not only insures clearer projection during periods of still projection, but also renders all of the light passing through the shield capable of being effectively utilized. In other forms of apparatus the shutter has been continuously operated during still projection. Thus it will be seen that for the light necessarily absorbed by the heat shield, when the still projection is effective, there is approximate compensation because of the cessation of movement of the shutter.

Since, however, the shutter is stopped during periods of still projection it is necessary to insure means for stopping the shutter in such position that it will not be in the path of projection of the picture or indicia being projected. This may be insured, as shown in Figure 20, by providing on the shutter shaft 56 a cam 220 with which cooperates a spring pressed roller 221. If the disengagement of the shutter shaft should occur at a time when the roller is on one of the high points of the cam 220, it will be effective for rotating the shutter shaft as will be obvious. The high points of the cam occupy a definite relation to the shutter blades, so that the rotation, if any, effected by roller 221 will properly position the shutter.

In other cases, as illustrated in Figure 21, for example, the same results may be obtained magnetically. This magnetic operation may be produced by providing in each shutter blade a button 222 of magnetic material, or permanently magnetized material. Carried by the frame F in such position as to cooperate with two blades of the shutter simultaneously are magnets 223 adapted to attract the buttons 222 and thus properly position the shutter. If desired, the magnets instead of being permanent, may be connected in parallel with the solenoid 218 as illustrated in Figure 18, whereby during all periods when the solenoid 218 is effective for producing still projection, the magnets 223 will be energized.

It can be seen from the description hereinbefore that the brake members 191 may be applied to slow down the motor and the connected apparatus, including the shutter 68 and intermittent sprocket 50, before these two parts are disconnected from the remainder of the apparatus. This initial slowing down of the shutter advantageously reduces the amount of work necessary to be done by the electromagnets 240 in completely stopping the shutter and also much reduces the shock of the stopping operation.

Under certain conditions of operation, it may be desirable to intermittently actuate the film at a slower speed than that possible with the motor M, to obtain in effect the projection of a succession of pictures as still or stereopticon pictures.

Figure 2:
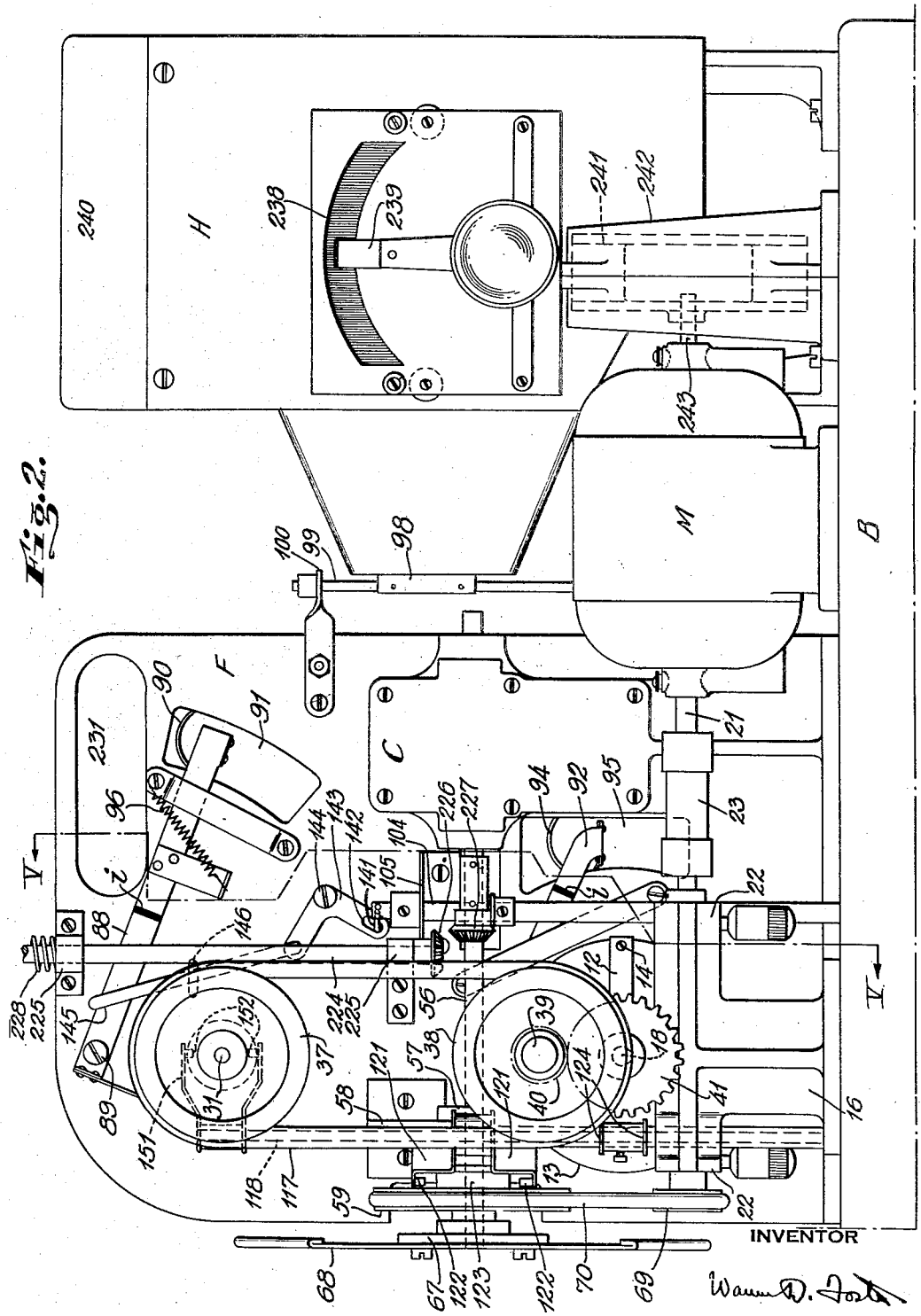
Figure 2 is a left side elevation of the machine.

This may be accomplished by the provision of a supplemental driving means for the shutter shaft 56, and illustrated more particularly in Figures 2 and 5. This auxiliary driving mechanism comprises a shaft 224 mounted in bearings 225 on the back of the frame F. At its lower end this shaft carries a bevel gear 226 adapted to mesh with a similar gear 227 on the shutter shaft 56. Normally, the gears 226 and 227 are maintained out of engagement by means of a compression spring 228 effective for moving the shaft 224 upwardly. At its upper end this shaft carries a knurled actuating nut or knob 230 which may be grasped at will by an operator, thereby enabling him to bring the gears 226 and 227 into engagement for the slow rotation of the shutter shaft. At this time it will be understood that the control button will occupy a position at station S2.

To facilitate handling the apparatus, the frame F may have a portion thereof shaped to provide a handle grip 231, as clearly illustrated in the drawings.

Carried by the frame F and positioned adjustably in line with the aperture through the gate is a lens casing 232 of any usual construction adapted for the focusing of a projected picture on a desired surface. Also, any usual form of condensing lens 233 may be utilized.

The combined lighting resistance and ventilating unit is contained within the housing H. Within this housing is mounted in any desired manner a lamp L adjustably carried by a bracket 234 having a pivotal mounting 235 in a bracket 236. Also having a pivotal mounting in the bracket 236 is a reflector R'.

Secured to one side of the housing is a resistance carrying unit 237 having a suitable resistance for the lamp L. Also mounted on the housing, and preferably exteriorly thereof, is a second resistance 238 with which cooperates a control finger 239 by means of which resistance may be cut into or out of the motor operating circuit at will.

The housing H at its lower end is preferably in spaced relation to the base B to permit the free circulation of air into the housing, and the top of the housing is closed by a slatted or louvre cover 240, permitting the egress of heated air from the housing. A positive circulation of cooling air through the housing is preferably continuously maintained in such manner as to be effective both on the lamp L and the lamp resistance 237. This circulation may be maintained by means of a fan 241 of suitable construction mounted in the fan casing 242, and driven by an extension 243 of the armature shaft of the motor M.

The resistance 237 may be originally proportioned with respect to the circuit with which the apparatus is to be used and therefore requires no adjustment. At times, however, it is preferable to operate the apparatus at varying speeds and by means of the rheostat or resistance 238 this may be effectively accomplished.

In Figure 1 of the drawings the film carriers are shown as being enclosed and as having pins 244 serving to prevent over-running of the film and protect the same generally. This protecting means may obviously be in the form of a casing or magazine, a pin, flange or roller, and can be mounted upon the projector itself or upon the film container.

The combined brake and tension control tends to produce a uniform film feed and is adaptable to apparatus of the well known type utilizing prisms instead of shutters for projecting purposes. In such cases the tension control insures the required synchronization and registration of successive pictures.

The construction and location of the gate and sprocket enable these parts to be easily removed and other parts substituted for the accommodation of films of different widths. This affords increased flexibility in the use of the apparatus whereby it is not limited to films of any one width.

As illustrated in Figure 21, the film adjacent the end secured to the lower carrier, reel or support, may have an elongated window w adapted to be in position over the sprocket at the conclusion of the rewinding operation. With this construction, when the driving spindle clutch is engaged, the take-up spindle 3 will be effective for frictionally initiating film movement. Thereafter, and while the film is in motion, it will be engaged in a normal manner by the sprocket so as to preclude possibility of shock or damage to the film.

Throughout the foregoing description reference has been made generally to projecting apparatus. The apparatus, however, is capable of use for regular photographic purposes in the taking of pictures.

Certain advantages of the present invention arise from the provision of an apparatus of the character adapted for the repetition display of a length of film, with means for automatically effecting reversal of the direction of travel of the film under such conditions that possibility of injury to the film either by heat, or by mechanical means, is materially minimized.

Other advantages arise from the provision in a photographic apparatus of means for electrically controlling the operation of the apparatus, the means preferably being such that the film itself is the determining element as to the time of reversal.

Still other advantages arise from the provision of a projecting apparatus embodying mechanisms adapted to occupy positions for either still projection or projection in motion, and automatic means preferably under the direct control of the film and comprising electrical means, for causing said mechanisms to occupy either position.

Additional advantages arise from reversing mechanisms for photographic apparatus of such nature that not only is a controllable dwell produced between reversals, but such that a change in speed of the film feeding means may be obtained at predetermined times. It has actually been found that the use of a fluid, and particularly air, is highly desirable for this purpose.

Further advantages arise from an automatically controlled reversing mechanism embodying a heat shield for the film and a shutter cut out effective in timed relation to each other to protect the film, enable use of a stronger light source, and to make possible the utilization of all light passed by the heat shield.

Still further advantages arise from a combined manual and automatic control, either of which may be utilized at will.

Other advantages arise from means necessarily operable at the commencement of normal feeding movement for first starting film feeding frictionally and then effecting positive feeding.

Other advantages arise from means for automatically reducing the speed of certain moving parts at predetermined times and maintaining such reduction in speed during predetermined periods of time.

Other advantages arise from means for automatically increasing the predeterminedly reduced speed of certain moving parts after they have been operated at such reduced speeds during desired periods of time.

I claim:

1. In a film handling apparatus, a member for feeding a film, a continuously operating driving mechanism for said feeding member, a brake for said driving mechanism, a releasable connection between said feeding member and said continuously operating mechanism, means for applying said brake to said driving mechanism, and control means operatively interconnecting said brake applying means and said releasable connection for operating both of the same.

2. In a film handling apparatus, a member for feeding a film, a continuously operating driving mechanism for said feeding member, a brake for said driving mechanism, a releasable connection between said feeding member and said continuously operating mechanism, means for applying said brake to said feeding mechanism, and sequential control means operatively interconnecting said brake applying means and said releasable connection and including devices for first operating said brake applying means and second releasing said connection whereby the speed of said continuously operating driving mechanism is checked before said feeding member is disconnected therefrom.

3. In a film handling apparatus, a member for feeding a film, a continuously operating driving mechanism for said feeding member, a brake for said driving mechanism, a releasable connection between said feeding member and said continuously operating mechanism, means for applying said brake to said driving mechanism, control means operatively interconnecting said brake applying means and said releasable connection for operating both of the same, and means actuated by the film for operating said control means.

4. In a film handling apparatus, a member for feeding a film, a continuously operating mechanism for driving said feeding member, a brake for said driving mechanism, means for applying said brake to said driving mechanism without affecting the continued operation of said driving mechanism, and control means actuated by a predetermined portion of the moving film for operating said brake applying means.

5. In a film handling apparatus, a member for feeding a film, continuously operating mechanism for driving said feeding member, a brake for said driving mechanism, electrical means including a circuit for applying said brake to said driving mechanism, and control means actuated by a signal carried by the moving film for closing said circuit.

6. In a film handling apparatus, a member for feeding a film, driving mechanism for said feeding member, means for operatively connecting said member and said driving mechanism, a brake for said driving mechanism, means operable for applying said brake to said mechanism for reducing the speed thereof, and sequential control means interconnecting said brake applying means and said connecting means for operating said brake applying means before the operation of said connecting means.

7. In a film handling apparatus, a member for feeding the film, continuously operating driving means for said feeding member, means for operatively connecting said feeding member and said driving mechanism, means operable for applying said brake to said driving means for reducing the speed thereof, means other than said feeding member for moving the film, sequential control means interconnecting said brake applying means and said connecting means for operating said brake applying means concomitantly with the operation of said connecting means, and means actuated by the film for operating said control means.

8. In a film handling apparatus, means for moving a film, means for driving said film moving means, a brake operable for reducing the speed of said driving means, means for operating said brake, means for connecting said film-moving means and said driving means, an electrical control circuit which when closed operates said connecting means, means for closing said circuit, and an operating connection between said circuit and said brake operating means including devices for operating said brake-operating means upon the closing of said circuit.

9. In a film handling apparatus, means for moving a film, means for driving said film moving means, a brake operable for reducing the speed of said driving means, means for operating said brake, means for disconnecting said film-moving means and said driving means, an electrical control circuit which when closed operates said disconnecting means, means controlled by the film while being moved by said moving means for closing said circuit, and an operating connection between said circuit and said brake operating means including devices for operating said brake-operating means upon the closing of said circuit.

10. In a film handling apparatus, a carrier supporting spindle, continuously operating means for driving said spindle, means for applying the power of said continuous driving means to said spindle, a brake for reducing the speed of operation of said continuous driving means, and control means operatively interconnecting said power applying means and said brake for operating both of the same.

11. In a film handling apparatus, a carrier supporting spindle, continuously operating means for driving said spindle, means for applying the power of said continuous driving means to said spindle, a brake for reducing the speed of operation of said continuous driving means, control means operatively interconnecting said power applying means and said brake for operating both of the same without affecting the continuous operation of said driving means, and means actuated by the regular movement of the film for operating said control means.

12. In a film handling apparatus, a carrier supporting spindle, continuously operating means for driving said spindle, means for rendering said driving means inoperative upon said spindle, a brake for reducing the speed of operation of said continuous driving means, and sequential control means operatively interconnecting said means for rendering said driving means inoperative upon said spindle and said brake for first operating said brake and thereafter operating said means for rendering said driving means inoperative upon said spindle.

13. In a film handling apparatus, a carrier supporting spindle, means for moving a film in relation to said spindle, means for driving said spindle and said film moving means, a brake for reducing the speed of operation of said continuous driving means, and control means actuated by a predetermined portion of the moving film for operating said brake without affecting the continuous operation of said driving means.

14. In a film handling apparatus, a carrier supporting spindle, continuously operating means for driving said spindle, means for feeding a film in relation to said spindle, a brake for reducing the speed of operation of said driving means, means including an electrical circuit for operating said brake, and control means actuated by a signal carried by the moving film for closing said circuit.

15. In a film handling apparatus, a film moving member, continuously operating means for driving said member, a clutch for applying the power of said continuously operating means to said member, means for operating said clutch, a brake for reducing the speed of operation of said continuously operating means, and control means operatively interconnecting said clutch and said brake for operating said clutch and said brake in timed relation one to the other.

16. In a film handling apparatus, a film moving member, continuously operating means for driving said member, a clutch for applying the power of said continuously operating means to said member, a brake for reducing the speed of said continuously operating driving means, means for operating said clutch so that it does not transmit the power of said driving means to said spindle, control mechanism operatively interconnecting said clutch operating means and said brake for operating each of the same in timed relation to the operation of the other thereof, and means responsive to the film as it is moved by said moving member for actuating said control mechanism.

17. In a film handling apparatus, means for feeding a film through said apparatus, driving means for said feeding means, means operable for stopping said feeding means, a brake operable for reducing the speed of said driving means, and sequential control means operatively interconnecting said stopping means and said brake for assuring the operation of said brake prior to the operation of said stopping means.

18. In a film handling apparatus, means for feeding a film through said apparatus, driving means for said feeding means, means operable for stopping said feeding means without affecting said driving means, a brake operable for reducing the speed of said driving means, control means operatively interconnecting said stopping means and said brake for applying said brake and operating said stopping means, and means controlled by the regular movement of the film in its normal course of operation for actuating said control means.

19. In a film handling apparatus, means for feeding a film through said apparatus, continuously operating driving means for said feeding means, means operable for stopping said feeding means while permitting the continued operation of said driving means, a brake operable for reducing the speed of said driving means, and control means interconnecting said stopping means and said brake, said control means including a first electric mechanism for operating said stopping means and a second electric mechanism operatively interconnected therewith for operating said brake concomitantly with the operation of said first electric mechanism.

20. In combination, a motion picture apparatus having an aperture, means for feeding a film past said aperture, and a shutter, which is moved in predetermined relation to the movement of the film, means for driving said shutter and said feeding means, means operable for stopping said shutter in a predetermined relation to said aperture, means operable for applying a retarding force to said driving means, and means interconnecting said retarding means and said shutter stopping means for necessarily operating said retarding means and said stopping means concomitantly.

21. In a film handling apparatus, an apertured member, means for feeding a film past the aperture of said member, a shutter which is moved in predetermined relation to the movement of said film feeding means, means for stopping said shutter in predetermined relation to said aperture, means for driving said feeding means and said shutter, a brake for retarding the movement of said driving means, and control mechanism for said stopping means and said brake, said control mechanism including a movable actuating member and connections between said actuating member and said brake and said shutter stopping means for operating both of the same upon the movement of said actuating member.

22. In a film handling apparatus, an apertured member, means for feeding a film past the aperture of said member, a shutter which is moved in predetermined relation to the movement of said film feeding means, means operable for stopping said shutter in predetermined relation to said aperture, said stopping means including coacting elements one revoluble with said shutter and the other operable to coact therewith for stopping said shutter, means for driving said feeding means and said shutter, a brake for retarding the movement of said driving means, and control mechanism for said stopping means and said brake, said control mechanism including a movable actuating member and connections between said actuating member and said brake and said operable stopping element of said stopping means for applying said brake and for operating said operable stopping element so that it assumes stopping relation to said other element, revoluble with said shutter, concomitantly with the operation of said brake.

23. In a film handling apparatus, an apertured member, means for feeding a film past the aperture of said member, a shutter which is moved in predetermined relation to the movement of said film feeding means, magnetic means having a circuit which when closed stops said shutter in predetermined relation to said aperture, means for driving said feeding means and said shutter, a brake for retarding the movement of said driving means and control mechanism operatively interconnecting the circuit of said magnet and said brake and including devices for concomitantly closing said cuircuit and operating said brake whereby the momentum of said driving means is lessened concomitantly with the operation of said magnetic stopping means.

24. In a film handling apparatus, an apertured member, means for feeding a film past the aperture of said member, a shutter which is moved in predetermined relation to the movement of said film feeding means, means for stopping said shutter in predetermined relation to said aperture, means for driving said feeding means and said shutter, a brake for retarding the movement of said driving means, and control mechanism for said stopping means and said brake, said control mechanism including a movable actuating member, connections between said actuating member and said brake and said shutter stopping means for operating both of the same upon the movement of said actuating member, and means controlled by the moving film for operating said actuating member.

25. In a film handling apparatus including a plurality of operable parts, an intermittent feeding member, a shutter operatively connected to said intermittent member for cooperative and timed movement therewith, means for driving said feeding member and said shutter, a brake for said driving means, means for disconnecting said intermittent member and said shutter from the remainder of the operable parts of the apparatus whereby they are freed from the momentum thereof, means for operating said brake, and sequential control means operatively interconnecting said disconnecting means and said brake operating means for first actuating said brake operating means and for thereafter operating said disconnecting means.

26. In a film handling apparatus, intermittent feeding means, a member for taking up a film as it is fed through the apparatus by said feeding means, a shutter connected to said feeding means for cooperative movement therewith, mechanism for driving said feeding means, said shutter, and said taking-up member, a brake for said driving mechanism, operable means for disconnecting said shutter and said feeding means from said driving mechanism while leaving said taking up member attached thereto, means for operating said disconnecting means, means for operating said brake, and means for stopping said shutter and said feeding means predeterminedly, said stopping means thereby operating without being required to overcome any momentum transmitted from said taking-up member and without being required to overcome the full momentum of said shutter.

27. In a film handling apparatus, an apertured member, means for feeding a film past the aperture of said member, a shutter for cooperative movement with said feeding means, mechanism for driving said feeding means and said shutter, a brake for retarding said driving mechanism, means for stopping said shutter in predetermined relation to said aperture, and control mechanism operatively interconnecting said shutter stopping means and said brake for first operating said brake and said shutter stopping means and thereafter rendering said shutter stopping means and said brake ineffective whereby the normal feeding operation may be carried out.

28. In a film handling apparatus, a toothed feeding member for a film, protective means for rendering the teeth of said feeding member inaccessible by the film, means for operating said protective means, means for driving said feeding member, and means for applying braking force to said driving means concomitantly with the operation of said means for operating said protective means.

29. In a film handling apparatus, a toothed feeding member for a film, means for driving said feeding member, protective means for separating the teeth of said member and the film, braking means for said driving means, and sequential control means operatively interconnecting said braking means and said protective means for first applying said braking means to said driving means and thereafter operating said protective means.

30. In a film handling apparatus, a toothed feeding member, means for separating a film and the teeth of said member, driving means for said feeding member, a brake for said driving means, means for applying said brake, and mechanism controlled by the film and operatively interconnecting said separating means and said brake applying means for actuating said brake applying means and said separating means.

31. In a film handling apparatus, a member for feeding the film, threading means operable for bringing the film into operative relation with said feeding member, driving means for said feeding member, a brake for said driving means, and control mechanism operatively interconnecting said threading means and said brake for concomitantly operating said brake and said threading means.

32. In a film handling apparatus, a member for feeding a film, threading means operable for bringing the film into operative relation with said feeding member, driving means for said feeding member, a brake for said driving means, means other than said feeding member for moving the film, control mechanism operatively interconnecting said threading means and said brake for concomitantly operating said brake and said threading means, and means actuated by the moving film for operating said control mechanism.

33. In a film handling apparatus, a member for feeding a film, threading means operable for bringing the film into operative relation with said feeding member, electrical means including a circuit for operating said threading means, driving means for said feeding member, a brake for said driving means, electrical means including a circuit for operating said brake, and control mechanism operatively interconnecting both of said circuits for concomitantly closing each of the same thereby concomitantly operating said brake and said threading means.

34. In a film handling apparatus, a gate including a fixed section and a section movable relatively to said fixed section, means for moving said movable gate section, means for feeding a film through said gate, means for driving said feeding means, a brake operable for reducing the speed of said feeding means, and sequential control means operatively interconnecting said means for moving said movable gate section and said brake for successively operating said brake and said means for moving said movable gate section.

35. In a film handling apparatus, a gate including a fixed section and a section movable relatively thereto, means for moving said movable section, means for feeding a film through said gate, means for driving said feeding means, a brake operable for reducing the speed of said feeding means, and control means operatively interconnecting said means for moving said movable gate section and said brake for operating both of the same.

36. In a film handling apparatus, a gate including a fixed section and a section movable relatively thereto, means for moving said movable section, means for feeding a film through said gate, means for driving said feeding means, a brake operable for reducing the speed of said feeding means, control mechanism operatively interconnecting said means for moving said movable gate section and said brake for operating both of the same, and means operated by the moving film for actuating said control mechanism.

37. In a film handling apparatus, a continuously moving delivery member, means for feeding a film intermittently, a continuously operating take-up member, means for compensating for the difference in the character of movement of said continuous members and said intermittent feeding means, operating mechanism for rendering said compensating means initially operative upon the film, means for driving said intermittent feeding means and said taking up member, a brake operable for reducing the speed of said driving means, and sequential control mechanism interconnecting said operating mechanism for said compensating means and said brake for operating said brake prior to rendering said compensating means initially operative upon the film.

38. In a film handling apparatus, a continuously operating film supporting member, a member for intermittently feeding a film in relation to said continuous member, means for driving said continuous member and said intermittent member, a brake for said driving means, a path defining member disposed between said continuous member and said intermittent member and movable between a first position wherein a short path is defined between said continuous member and said intermittent member and a second position wherein a long path is defined therebetween, means for moving said path defining member between said first and said second positions, means for applying said brake for reducing the speed of operation of said driving means, and control means interconnecting said means for moving said path defining member between said positions and said brake applying means for concomitantly operating both of the same.

39. In a film handling apparatus, a continuously operating film supporting member, a member for intermittently feeding a film in relation to said continuous member, means for driving said continuous member and said intermittent member, a brake for said driving means, a path defining member disposed between said continuous member and said intermittent member and movable between a first position wherein a short path is defined between said continuous member and said intermittent member and a second position wherein a long path is defined therebetween, means for moving said path defining member between said first and said second position, means for applying said brake for reducing the speed of operation of said driving means, control means interconnecting said means for moving said path defining member between said positions and said brake applying means for concomitantly operating both of the same, and means actuated by the film for operating said control means.

40. In a film handling apparatus, a continuously operating film supporting member, an intermittent member for intermittently feeding the film in relation to said continuous member, means for driving said intermittent member, a brake for said means, means operable for increasing the stretch of the film between said continuous member and said intermittent member, means for operating said stretch increasing member, means for applying said brake for reducing the speed of said driving means, and control means interconnecting said means for operating said stretch increasing member and said brake applying means for concomitantly operating both of said means.

41. In a film handling apparatus, a continuously operating film supporting member, a member for intermittently feeding the film in relation to said continuous member, means for driving said intermittent member, a brake for said driving means, means operable for increasing the stretch of the film between said continuous member and said intermittent member, means for operating said stretch increasing member, means for applying said brake for reducing the speed of said driving means, control means interconnecting said means for concomitantly operating said stretch increasing member and said brake applying means, and means actuated by the film for operating said control means.

42. In a film handling apparatus, mechanism for moving a film in one direction, mechanism for moving the film in the other direction, a continuously operating driving mechanism for said film moving mechanisms, means for rendering said moving mechanisms alternatively operable, braking means for said driving mechanism, and control means interconnecting both of said recited means for operating them.

43. In a film handling apparatus, means for moving a film in one direction, alternatively operable means for moving the film in the other direction, mechanism for driving said film moving means, braking means for said driving mechanism, control mechanism operatively interconnecting all of said means for alternately operating each of said feeding means and for operating said braking means in timed relation to such alterations, and means actuated by the film for operating said control mechanism.

44. In a film handling apparatus, a rewinding spindle, a clutch for said rewinding spindle, a taking up spindle, a clutch for said taking up spindle, means for driving said spindles alternatively, a brake for said driving means, and sequential control mechanism operatively interconnecting said clutches and said brake for first applying said brake and for thereafter rendering said taking up spindle clutch inoperative, and subsequently for again operating said brake and thereafter making said rewinding spindle clutch operative.

45. In a film handling apparatus, means for moving a film in one direction, means for moving the film in the other direction, a motor for driving both of said film moving means, a brake for said motor, operable means for applying said brake temporarily for reducing the speed of said motor, and sequential control means operatively interconnecting both of said film moving means and said brake applying means for first operating said brake applying means and thereafter for operating said means for moving the film in the opposite direction to which it was moving before said brake was applied.

46. In a film handling apparatus, means for moving a film in one direction, alternatively actuable means for moving a film in the opposite direction, means for driving both of said film moving means, a brake operable for reducing the speed of said driving means, said brake including a drum on said driving means, two brake shoes, one shoe engaging said drum on one side thereof and the other shoe engaging said drum on the opposite side from said first named shoe, two oppositely acting solenoids connected to said brake shoes, one of said solenoids being effective for applying one of said shoes to said drum, the other of said solenoids being effective for applying the other of said brake shoes to said drum, control means for energizing at least one of said solenoids, and means controlled by the film and operatively interconnected with both of said film moving means for actuating said control means in timed relation to the alternative actuations of said moving means respectively.

47. In a film handling apparatus, an openable gate, mechanism for opening and closing said gate, means for feeding a film through said gate, means for taking up the film, means for rewinding the film, driving means for all of said previously mentioned means, a brake operable for reducing the speed of said driving means, sequential control means interconnecting said gate opening and closing mechanism, said feeding means, said rewinding means, and said brake, said control means including devices for closing said gate prior to the operation of said feeding means and opening said gate prior to the operation of said rewinding means and devices for applying said brake prior to the stopping of operation of either said feeding means or said rewinding means, and means actuated by the film for operating said control means predeterminedly, said operating means including a first electric mechanism for operating said gate opening and closing mechanism, said feeding means and said rewinding means, and a second electric mechanism for operating said brake concomitantly with the operation of said first electric mechanism.

48. In a film handling apparatus, a source of light, means for feeding a film past said light source for projecting pictures therefrom, means operable for reducing the light from said source reaching the film, means for rendering said feeding means inoperative, driving means for said feeding means, braking means for said driving means, and control mechanism operatively interconnecting said braking means and said light reducing means for concomitantly operating said braking means and said light reducing means whereby the light reaching the film while said braking means are applied to said driving means is lessened.

49. In a film handling apparatus, a source of light, means for feeding a film past said light source for projecting pictures therefrom, means operable for stopping said feeding means, means operable for protecting the film from the heat of said light source while the movement of the film is stopped, driving means for said feeding means, a brake for said driving means, and control mechanism operatively interconnecting said brake and said heat protective means for operating said brake and said heat protective means concomitantly whereby the light from said source reaching the film while said brake is applied to said driving means is lessened.

50. In a motion picture apparatus, guiding means defining a pathway for a film through said apparatus including relatively fixed members and a relatively movable member, means for moving said movable guiding member to and from a film guiding position, a power drive means for varying the speed of said power drive, a control for said speed varying means, and operative interconnection between the control and the means for moving said relatively movable member for increasing the speed of the power drive concomitantly with the movement of the movable member from a film guiding position.

51. In a motion picture apparatus, a plurality of film guiding members, some movably mounted and others immovably mounted on a base, power operated means for moving the movably mounted guide members, a power drive, mechanism operated by said power drive for moving a film through the guiding members, and means for controlling the speed of the power drive in accordance with the positions of a movable film guide.

52. In a motion picture apparatus, a plurality of film guiding members, some movably mounted and others immovably mounted on a base, the movably mounted members being movable to one position wherein they establish a path through which the film is threaded into said apparatus and another position wherein they establish a path through which the film is thereafter fed, power operated means for concomitantly moving the movably mounted guiding members, an operable device for preventing the effective application of said power means for moving said movably mounted guiding members, a power drive to feed the film along the path established by said guide members, a variable speed device for controlling the speed of the power drive, and connecting members between the variable speed device and said movably mounted film guiding member for simultaneously actuating both.

53. In a motion picture apparatus, a plurality of film guiding means, some movably mounted and others immovably mounted upon a base, power operated means for moving the movably mounted guiding means to a predetermined position, a movable device located in the path of a film passing through the guiding means and adapted to be operated by the film passing therethrough, said movable device being adapted to control the application of the power of said power operated means to move the guiding means to said position, a power drive to feed film through said guide means, a variable speed device for controlling the speed of the power drive, and connecting members between the variable speed device and the movably mounted guiding means for simultaneously actuating both.

54. In a motion picture apparatus, guiding means establishing a pathway through which a film may be fed, said path-forming means including a plurality of facing film guiding members, some fixedly mounted and some movably mounted whereby the width of the film pathway may be varied, operable connections between the movably mounted members, a power drive, and a control member operable by the film for regulating the application of the power of said drive to the movably mounted members.

55. In a motion picture apparatus, a plurality of sets of guide members, some relatively fixed and others relatively movable, each member forming a portion of a film pathway through the apparatus, at least one portion of said film pathway including a pair of spaced oppositely faced and relatively fixed surfaces so disposed that they guide the edges of the film and form side walls of said portion of said pathway, and a control member located adjacent one of said side walls and adapted to be acted upon by an edge of a film passing therethrough said control member being operatively interconnected to the movable guide members.

56. In a film handling apparatus having an operable part and continuously operating driving mechanism for operating said part, means for starting the operation of said part, a magnetic brake for said driving mechanism, said brake including a circuit which when closed renders said brake effective upon said driving mechanism, and control mechanism operatively interconnecting said starting means and said circuit for actuating said starting means and closing said circuit thereby subjecting said driving mechanism to the retarding influence of said brake upon the operation of said starting means.

57. In a film handling apparatus having an operable part and continuously operating driving mechanism for operating said part, means for starting the operation of said part, a magnetic brake for said driving mechanism, said brake including a circuit which when closed renders said brake effective upon said driving mechanism, control mechanism operatively interconnecting said starting means and said circuit for actuating said starting means and closing said circuit thereby subjecting said driving mechanism to the retarding influence of said brake upon the operation of said starting means, and means for releasing said brake after a predetermined period whereby said driving means may operate at normal speed.

58. In a film handling apparatus having an operable part and a continuously operating driving mechanism for operating said part, a magnetic brake for said driving mechanism, said magnetic brake including a circuit which when closed is effective to apply said brake to said driving mechanism, and control mechanism, said control mechanism including means for stopping the operation of said part without affecting said driving mechanism, said stopping means including an electrical circuit which when closed is effective to actuate said stopping means to stop the operation of said operable part, and means operatively interconnecting said circuits for concomitantly closing both thereof.

59. In a film handling apparatus having an operable part, a film moving means, and continuously operating driving mechanism for operating said part, a clutch for transmitting the power of said mechanism to said part, electrical means including an actuating circuit for operating said clutch, a magnetic brake for said driving mechanism, said brake including an actuating circuit for operating said brake, and control mechanism operative interconnecting said circuits for concomitantly controlling each of said circuits for concomitantly operating said clutch and said brake.

60. In a film handling apparatus having an operable part, film moving means, and continuously operating driving mechanism for operating said part, a clutch for transmitting the power of said mechanism to said part, electrical means including an actuating circuit for operating said clutch, a magnetic brake for said driving mechanism, said brake including an actuating circuit, control mechanism operatively interconnecting said circuits for concomitantly controlling each of said circuits for concomitantly operating said clutch and said brake, and means actuated by the moving film for operating said control mechanism.

WARREN DUNHAM FOSTER.